United States Patent
Liu et al.

(10) Patent No.: US 10,250,384 B2
(45) Date of Patent: Apr. 2, 2019

(54) VISIBLE LIGHT ENCRYPTION METHOD, DECRYPTION METHOD, COMMUNICATION DEVICE AND COMMUNICATION SYSTEM

(71) Applicant: KUANG-CHI INNOVATIVE TECHNOLOGY LTD., Shenzhen (CN)

(72) Inventors: Ruopeng Liu, Shenzhen (CN); Lin Luan, Shenzhen (CN); Guangjin Xiao, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 232 days.

(21) Appl. No.: 14/608,793

(22) Filed: Jan. 29, 2015

(65) Prior Publication Data

US 2015/0146871 A1 May 28, 2015

Related U.S. Application Data

(63) Continuation of application No. PCT/CN2013/080579, filed on Jul. 31, 2013.

(30) Foreign Application Priority Data

Jul. 31, 2012 (CN) .......................... 2012 1 0268555
Aug. 7, 2012 (CN) .......................... 2012 1 0277987
(Continued)

(51) Int. Cl.
*H04L 29/06* (2006.01)
*H04L 9/08* (2006.01)
(Continued)

(52) U.S. Cl.
CPC .......... *H04L 9/0852* (2013.01); *H04B 10/116* (2013.01); *H04L 9/12* (2013.01); *H04L 2209/80* (2013.01)

(58) Field of Classification Search
CPC ... H04W 12/06; H04W 12/02; G06F 12/1408; G06F 2212/402; G06F 13/1689; H04L 9/12; H04L 9/0852; H04L 7/0075
See application file for complete search history.

(56) References Cited

U.S. PATENT DOCUMENTS

| 4,757,536 A | 7/1988 | Forest et al. |
| 4,811,394 A * | 3/1989 | Ragavan ........... H04L 25/03866 370/280 |

(Continued)

FOREIGN PATENT DOCUMENTS

| CN | 1194744 A | 9/1998 |
| CN | 1494252 A | 5/2004 |

(Continued)

OTHER PUBLICATIONS

Tang et al., Photonic Encryption Using All Optical Logic, Dec. 2003, Sandia National Labratories, 48 Pages.*

(Continued)

*Primary Examiner* — Christopher C Harris
(74) *Attorney, Agent, or Firm* — Perkins Coie LLP

(57) ABSTRACT

The present invention discloses a visible light encryption method, a decryption method, a communication device and a communication system. The method includes: receiving a visible light signal from a transmit end, where the visible light signal is encrypted at the transmit end by using a key; and obtaining the key, and decrypting the visible light signal according to the key, where the obtaining the key includes: obtaining a key corresponding to a state of a state machine of a receive end; or, obtaining indication information according to the visible light signal and obtaining the key according to the indication information, where the indication information is used to obtain the key. The present invention solves a problem of decryption failure in visible light (Continued)

encryption and decryption, and improves accuracy of decryption.

4 Claims, 14 Drawing Sheets

(30) Foreign Application Priority Data

Jul. 24, 2013 (CN) .......................... 2013 1 0314157
Jul. 29, 2013 (CN) .......................... 2013 1 0323062

(51) Int. Cl.
*H04B 10/116* (2013.01)
*H04L 9/12* (2006.01)

(56) References Cited

U.S. PATENT DOCUMENTS

| | | | |
|---|---|---|---|
| 7,155,016 B1* | 12/2006 | Betts | H04L 25/03866 380/221 |
| 2002/0044652 A1* | 4/2002 | Abe | H04L 9/065 380/42 |
| 2005/0105730 A1* | 5/2005 | Kasamura | H04L 25/03872 380/210 |
| 2010/0195831 A1* | 8/2010 | Tanaka | H04L 9/0858 380/256 |
| 2010/0209105 A1 | 8/2010 | Shin | |
| 2011/0105134 A1* | 5/2011 | Kim | H04B 10/116 455/450 |
| 2011/0196965 A1 | 8/2011 | Romero | |

FOREIGN PATENT DOCUMENTS

| | | |
|---|---|---|
| CN | 1593033 A | 3/2005 |
| CN | 1947373 A | 4/2007 |
| CN | 101001142 A | 7/2007 |
| CN | 101502040 A | 8/2009 |
| CN | 101645771 A | 2/2010 |
| CN | 101938310 A | 1/2011 |
| CN | 102035642 A | 4/2011 |
| CN | 102289634 A | 12/2011 |
| CN | 102378168 A | 3/2012 |
| CN | 102479398 A | 5/2012 |
| CN | 102610013 A | 7/2012 |
| CN | 102780695 A | 11/2012 |
| CN | 102820922 A | 12/2012 |
| CN | 102833065 A | 12/2012 |
| CN | 102932142 A | 2/2013 |
| JP | H113440 U | 7/1989 |
| JP | H07312593 A | 11/1995 |
| JP | 2007110276 A | 4/2007 |
| JP | 2012026225 A | 2/2012 |

OTHER PUBLICATIONS

Alfalou et al, Optical image compression and encryption methods, Oct. 28, 2009, OSA, 48 Pages.*
Mishra et al, Internet using Visible Light Communication, Oct. 5, 2011, IACSIT, 6 Pages.*

* cited by examiner

VISIBLE LIGHT ENCRYPTION METHOD, DECRYPTION METHOD, COMMUNICATION DEVICE AND COMMUNICATION SYSTEM

CROSS REFERENCE TO RELATED APPLICATIONS

This application is a continuation of PCT/CN2013/080579 filed on Jul. 31, 2013, which claims priority to Chinese patent application No. 201210268555.5 of Jul. 31, 2012; Chinese patent application No. 201210277987.2 of Aug. 7, 2012; Chinese patent application No. 201310314157.7 of Jul. 24, 2013; and Chinese patent application No. 201310323062.1 of Jul. 29, 2013; all of which are incorporated herein by reference.

TECHNICAL FIELD

The disclosure relates to the communications field, and in particular, to a visible light encryption method, decryption method, a communication device and a communication system.

BACKGROUND

A conventional Internet of things generally implements interconnection and interworking by using various wired or wireless communication networks, and uses conventional communications technologies. Recently, a technology of the Internet of things that uses visible light to propagate in free space and perform near field communication emerges. The Internet of things that uses a visible light communication technology is herein called a photonic Internet of things. The photonic Internet of things has functions of a conventional Internet of things, but communication is performed by using visible light.

Because visible light has high directivity and cannot penetrate a barrier, it is more secure than a radio communication manner. Therefore, on occasions such as a photonic Internet of things, visible light is phased in for near field communication. Currently, some visible light communication systems that perform encryption and decryption synchronously already exist in the photonic Internet of things. Such systems use a synchronization manner to cause a visible light transmitter and a receiver to always use the same and time-varying pseudocode sequence to perform encryption and decryption. The encryption and decryption of the visible light communication can lead to invalidity of a stroboscopic light signal that is shot and replicated by a high-speed camera, and make the signal unrecognizable to a receiver, which can remove security threats effectively.

In a handshake synchronization method used in the visible light communication system with synchronous encryption and decryption, an optical signal and baseband data are separately scrambled in a transmitter, then combined into a group of signals, and then modulated and transmitted. After the signals are received and demodulated at the receiver, pseudocode determination is performed for an encrypted optical signal; a pseudocode sequence used in encryption is queried and selected by means of traverse; then, the baseband data is decrypted; finally, an ID determiner is used to determine ID information obtained by decryption and ID information stored in a corresponding register and ultimately determine whether the signal is a legal signal or an illegally replicated signal, thereby finishing decryption.

The pseudocode sequence used for encryption in the transmitter and the pseudocode sequence used for decryption in the receiver are the same and time-varying. Therefore, a prerequisite of using the synchronization-based visible light communication system is that a time change in the visible light transmitter is completely consistent with that in the visible light receiver. That is, internal clocks of the transmitter and the receiver need to be completely consistent, and time errors need to be very small. With respect to crystal oscillator components used currently, complete consistency is hardly accomplishable. With increase of usage time, a time difference between time systems of the two is greater, and finally, synchronization information is lost, which leads to inconsistent state variation between the transmitter and the receiver. That is, when the pseudocode sequence used at one end changes, the other end does not reach a time point of change but continues using the original pseudocode sequence, thereby leading to a decryption failure.

In addition, a synchronization-based encryption method requires the transmitter and the receiver to perform time synchronization. Synchronization information is lost when one end encounters power outage. In order to recover the synchronization information after the end is powered on again, a reset signal needs to be used to cause the non-power-interrupted end to get synchronized again, which increases system complexity and may bring inconvenience of usage.

SUMMARY

In view of a decryption failure problem that may occur in visible light encryption and decryption, embodiments of the present invention provides a visible light encryption method, a decryption method, a communication device and a communication system.

According to one aspect of the embodiments of the present invention, a visible light signal decryption method is provided, including: receiving a visible light signal from a transmit end, where the visible light signal is encrypted at the transmit end by using a key; and obtaining the key, and decrypting the visible light signal according to the key, where the obtaining the key includes: obtaining a key corresponding to a state of a state machine of a receive end; or, obtaining indication information according to the visible light signal and obtaining the key according to the indication information, where the indication information is used to obtain the key.

Preferably, the obtaining indication information according to the visible light signal and obtaining the key according to the indication information, where the indication information is used to obtain the key includes: converting the received visible light signal into a digital signal; decomposing the digital signal into a signal that includes a pseudocode sequence indicator and a pseudocode signal; querying a pseudocode sequence corresponding to the pseudocode sequence indicator, where the pseudocode sequence is the key; and decrypting the pseudocode signal according to the pseudocode sequence.

Preferably, the decomposing the digital signal into a signal that includes a pseudocode sequence indicator and a pseudocode signal, and querying a pseudocode sequence corresponding to the pseudocode sequence indicator includes: decomposing the digital signal into a device addressing code and a first integrated signal; decomposing the first integrated signal into the pseudocode sequence indicator and the pseudocode signal; and determining legality of the pseudocode sequence indicator according to a device addressing code, and if the pseudocode sequence indicator is legal, querying the pseudocode sequence corresponding to the pseudocode sequence indicator.

Preferably, the querying the pseudocode sequence corresponding to the pseudocode sequence indicator includes: determining, according to a received pseudocode sequence indicator, whether the pseudocode sequence indicator is legal; if the pseudocode sequence indicator is legal, querying the pseudocode sequence corresponding to the pseudocode sequence indicator; and if the pseudocode sequence indicator is illegal, giving a prompt of an incorrect password. Preferably, the method further includes: querying ID information corresponding to the device according to the device addressing code, and comparing the ID information with ID information obtained by decoding; and if the same, determining that the ID is legal, and outputting legal ID information.

Preferably, the method further includes: controlling a corresponding device according to the legal ID information.

Preferably, after the converting the received visible light signal into a digital signal, the method further includes: demodulating the digital signal.

Preferably, the determining legality of the pseudocode sequence indicator according to a device addressing code includes: querying, when the pseudocode sequence indicator is a large number that is not cyclic in ascending order, the received pseudocode sequence indicator according to the device addressing code; if the pseudocode sequence indicator is less than or equal to the received pseudocode sequence indicator, determining that the pseudocode sequence indicator is invalid; otherwise, determining that the pseudocode sequence indicator is legal; or querying, when the pseudocode sequence indicator is a large number that is not cyclic in descending order, the received pseudocode sequence indicator according to the device addressing code; if the pseudocode sequence indicator is greater than or equal to the received pseudocode sequence indicator, determining that the pseudocode sequence indicator is invalid; otherwise, determining that the pseudocode sequence indicator is legal.

Preferably, the decrypting the pseudocode signal according to the pseudocode sequence includes: performing a logical operation on the pseudocode sequence and the pseudocode signal to decrypt the pseudocode signal.

Preferably, the obtaining indication information according to the visible light signal, where the indication information is used to obtain the key includes: determining a clock change parameter of the transmit end and a clock change parameter of the receive end according to the visible light signal; determining a clock quickness or slowness factor of the transmit end according to the clock change parameter of the transmit end and the clock change parameter of the receive end; and updating clock information of the transmit end at intervals of a preset time according to the clock quickness or slowness factor of the transmit end, where the clock information of the transmit end is stored locally at the receive end and is used to obtain indication information of the key.

Preferably, the clock change parameter of the transmit end refers to an actually elapsed standard time corresponding to a unit time of system time of the transmit end, and the clock change parameter of the receive end refers to an actually elapsed standard time corresponding to the unit time of system time of the receive end, where the actually elapsed standard time is measured by using a system period of a crystal oscillator of the receive end as a unit.

Preferably, the clock quickness or slowness factor of the transmit end is a ratio of the actually elapsed standard time corresponding to the unit time of the system time of the receive end to the actually elapsed standard time corresponding to the unit time of the system time of the transmit end.

Preferably, the preset time is a preset time of the system time of the receive end; upon elapse of every preset time, an error of the clock information that is of the transmit end and locally stored at the receive end is a result of subtracting a product of the clock quickness or slowness factor of the transmit end and the preset time from the preset time; and the updating clock information that is of the transmit end and locally stored at the receive end includes: subtracting the error from the clock information of the transmit end that is stored locally.

Preferably, the unit time is nominal duration of a light pulse of the visible light signal received from the transmit end, where the nominal duration is equal to a reciprocal of a nominal baud rate of the visible light signal.

Preferably, the actually elapsed standard time corresponding to the unit time of the system time of the transmit end is obtained by measuring the duration of a light pulse of the visible light signal at the receive end, where the visible light signal is received from the transmit end, and the standard time is denoted by $M \cdot T_{2\ system}$ by using the system period of the crystal oscillator of the receive end as a unit; and the actually elapsed standard time corresponding to the unit time of the system time of the receive end is calculated as $(T_{0\ nominal} \cdot f_{2\ nominal}) \cdot T_{2\ system}$, where $T_{0\ nominal}$ is nominal duration of a light pulse of the visible light signal, $f_{2\ nominal}$ is a nominal frequency of the crystal oscillator of the receive end, and $T_{2\ system}$ is the system period of the crystal oscillator of the receive end.

Preferably, the measuring the duration of a light pulse of the visible light signal at the receive end, where the visible light signal is received from the transmit end includes: converting the visible light signal received from the transmit end into a digital signal; and counting how many $(T_{2\ system})$s have elapsed from the start of a high level or a low level of a pulse of the digital signal until the end of the high level or the low level, where the counted number is M.

Preferably, the converting the visible light signal received from the transmit end into a digital signal includes: converting the visible light signal into an electrical pulse signal by using a photodiode; outputting a high-voltage level when a value of a current that passes through the photodiode is higher than a threshold; and outputting a low-voltage level when the value of a current that passes through the photodiode is lower than the threshold.

Preferably, the threshold is determined by at least a distance between the receive end and the transmit end according to a preset mathematic model.

Preferably, the method further includes: whenever the visible light signal is received from the transmit end subsequently, repeating the steps from the step of determining a clock change parameter of the transmit end and a clock change parameter of the receive end to the step of updating the stored clock information of the transmit end.

Preferably, whenever the visible light signal is received from the transmit end subsequently, a corresponding pseudocode signal is selected according to the stored clock information of the transmit end to decode the received visible light signal.

Preferably, the clock information that is of the transmit end and locally stored at the receive end is initially stored as correlated with an identifier of the transmit end when the receive end initially receives the visible light signal of the transmit end, and is set to be equal to then-current clock information of the receive end.

Preferably, the obtaining a key corresponding to a state of a state machine of a receive end and decrypting the visible light signal according to the key, include: obtaining keys corresponding to a current state of the state machine of the receive end and at least one state before and/or after the current state, and using the key to decrypt the visible light signal, where the visible light signal is encrypted by using a key that varies with the state of the state machine of the transmit end.

Preferably, the using keys corresponding to a current state of the state machine of the receive end and at least one state before and/or after the current state to decrypt the visible light signal includes: using the key corresponding to the current state of the state machine of the receive end to decrypt the visible light signal; and continuing to use the key corresponding to the at least one state before and/or after the current state to decrypt the visible light signal if the decryption performed for the visible light signal by using the key corresponding to the current state of the state machine of the receive end fails.

Preferably, using the key corresponding to the at least one state before and/or after the current state to decrypt the visible light signal includes: decrypting the visible light signal by using a key corresponding to each state of the at least one state before and/or after the current state in preset order until the visible light signal is decrypted successfully or until the keys corresponding to all states of the at least one state before and/or after the current state have been used for decrypting the visible light signal.

Preferably, the visible light signal includes communication data and the identifier of the transmit end.

Preferably, the communication data is encrypted by using the key that varies with the state of state machine of the transmit end, the identifier of the transmit end is not encrypted, and communication data correlated with the identifier of the transmit end is stored locally at the receive end.

Preferably, the method further includes: obtaining the identifier of the transmit end from the visible light signal, where if the communication data obtained as a result of decrypting the visible light signal by using the keys corresponding to the current state of the state machine of the receive end and one state among at least one state before and/or after the current state is the same as the communication data correlated with the identifier of the transmit end and stored locally at the receive end, the decryption performed for the visible light signal by using the key corresponding to the one state succeeds; otherwise, the decryption fails.

Preferably, the communication data includes user information, and the user information includes ID information, a fingerprint, a face, an iris, an input password, or a combination of two or more thereof, and the method further includes: identifying the visible light signal as an illegal signal if both the decryption performed for the visible light signal by using the key corresponding to the current state of the state machine of the receive end and the decryption for the visible light signal performed by using the key corresponding to the at least one state before and/or after the current state fail; otherwise, identifying the visible light signal as a legal signal.

Preferably, the using keys corresponding to a current state of the state machine of the receive end and at least one state before and/or after the current state to decrypt the visible light signal includes: decrypting the visible light signal by using the keys corresponding to the current state and each state of the at least one state before and/or after the current state in preset order until the visible light signal is decrypted successfully or until the keys corresponding to the current state and all states of the at least one state before and/or after the current state have been used for decrypting the visible light signal.

Preferably, the at least one state includes states of a preset quantity before the current state and states of a preset quantity after the current state.

Preferably, the key that varies with the state of the state machine of the transmit end and the keys corresponding to the current state of the state machine of the receive end and at least one state before and/or after the current state are time-varying sequences.

Preferably, the time-varying sequences are pseudocode sequences, the method further includes: converting the visible light signal into a digital signal, and the decryption includes logical AND, logical OR, logical XOR or a combination of two or more thereof for the digital signal and the pseudocode sequences.

According to another aspect of the embodiments of the present invention, a communication device is provided, including: a receiver, configured to receive a visible light signal from a transmit end, where the visible light signal is encrypted at the transmit end by using a key; and a decoder, configured to obtain the key, and decrypt the visible light signal according to the key, where the obtaining the key includes: obtaining the key corresponding to a state of a state machine of a receive end; or, obtaining indication information according to the visible light signal and obtaining the key according to the indication information, where the indication information is used to obtain the key.

Preferably, the receiver is a visible light receiver configured to receive a visible light signal and output a digital signal; and the decoder includes: a pseudocode sequence indicator decomposing unit, configured to decompose the digital signal into a signal that includes a pseudocode sequence indicator and a pseudocode signal; a pseudocode sequence querying unit, configured to query a pseudocode sequence corresponding to the pseudocode sequence indicator, where the pseudocode sequence is the key; and a convolutional decoder, configured to perform a logical operation on the pseudocode sequence and the pseudocode signal and output a logical operation result.

Preferably, the decoder further includes: a device addressing code decomposing unit, configured to decompose the digital signal into a device addressing code and a first integrated signal; the pseudocode sequence indicator decomposing unit is configured to decompose the first integrated signal into the pseudocode sequence indicator and the pseudocode signal; and the pseudocode sequence querying unit is configured to determine legality of the pseudocode sequence indicator according to the device addressing code, and if the pseudocode sequence indicator is legal, query the pseudocode sequence corresponding to the pseudocode sequence indicator.

Preferably, the pseudocode sequence querying unit is configured to: determine, according to a received pseudocode sequence indicator, whether the pseudocode sequence indicator is legal; if the pseudocode sequence indicator is legal, query the pseudocode sequence corresponding to the pseudocode sequence indicator; and if the pseudocode sequence indicator is illegal, give a prompt of an incorrect password.

Preferably, the device further includes: a querying unit, configured to query corresponding ID information according to the device addressing code; and an ID determiner, configured to compare the ID information output by the convolutional decoder with ID information output by the querying unit, and if the same, determine that the ID is legal, and output legal ID information.

Preferably, the device further includes: a device control circuit connected to the ID determiner and configured to control a corresponding device according to received ID information.

Preferably, the device further includes: a demodulator connected between the visible light receiver and the device addressing code decomposing unit, and configured to demodulate the digital signal.

Preferably, the receiver receives a visible light signal from a transmitting device, where the visible light signal is at least partially encrypted on the transmitting device by using a key that varies with a state of a state machine of the transmitting device; and the decoder is configured to use keys corresponding to a current state of the state machine of the communication device and at least one state before and/or after the current state to decrypt the visible light signal.

Preferably, the decoder is configured to use a key corresponding to the current state of the state machine of the communication device to decrypt the visible light signal; and if the decryption of the visible light signal by using the key corresponding to the current state of the state machine of the communication device fails, continue to use the key corresponding to the at least one state before and/or after the current state to decrypt the visible light signal.

Preferably, the decoder decrypts the visible light signal by using a key corresponding to each state of the at least one state before and/or after the current state in preset order until the visible light signal is decrypted successfully or until the keys corresponding to all states of the at least one state before and/or after the current state have been used for decrypting the visible light signal.

Preferably, the decoder decrypts the visible light signal by using keys corresponding to the current state and each state of the at least one state before and/or after the current state in preset order until the visible light signal is decrypted successfully or until the keys corresponding to the current state and all states of the at least one state before and/or after the current state have been used for decrypting the visible light signal.

Preferably, the receiver is configured to receive a visible light signal from a transmit end; and the decoder includes: a clock change parameter determining module, which determines a clock change parameter of the transmit end and a clock change parameter of the communication device according to the visible light signal received from the transmit end; a clock quickness or slowness factor determining module, which determines a clock quickness or slowness factor of the transmit end according to the clock change parameter of the transmit end and the clock change parameter of the communication device; and a clock information adjusting module, configured to update clock information of the transmit end at intervals of a preset time according to the clock quickness or slowness factor of the transmit end, where the clock information of the transmit end is stored locally in the communication device.

Preferably, the clock change parameter of the transmit end refers to an actually elapsed standard time corresponding to a unit time of system time of the transmit end, and the clock change parameter of the communication device refers to an actually elapsed standard time corresponding to the unit time of system time of the communication device, where the actually elapsed standard time is measured by using a system period of a crystal oscillator of the communication device as a unit.

Preferably, the clock quickness or slowness factor determining module determines that the clock quickness or slowness factor of the transmit end is a ratio of the actually elapsed standard time corresponding to the unit time of the system time of the communication device to the actually elapsed standard time corresponding to the unit time of the system time of the transmit end.

Preferably, the preset time is a preset time of the system time of the communication device; upon elapse of every preset time, an error of the clock information of the transmit end that is stored locally in the communication device is a result of subtracting a product of the clock quickness or slowness factor of the transmit end and the preset time from the preset time; and the clock information adjusting module subtracts the error from the clock information of the transmit end that is stored locally.

Preferably, the unit time is nominal duration of a light pulse of the visible light signal received from the transmit end, where the nominal duration is equal to a reciprocal of a nominal baud rate of the visible light signal.

Preferably, the actually elapsed standard time corresponding to the unit time of the system time of the transmit end is obtained by the clock change parameter module by measuring duration of a light pulse of the visible light signal at the communication device, where the visible light signal is received from the transmit end, and the standard time is denoted by $M \cdot T_{2\ system}$ by using the system period of the crystal oscillator of the communication device as a unit; and the actually elapsed standard time corresponding to the unit time of the system time of the communication device is calculated as $(T_{0\ nominal} \cdot f_{2\ nominal}) \cdot T_{2\ system}$ system according to the clock change parameter, where $T_{0\ nominal}$ is nominal duration of a light pulse of the visible light signal, $f_{2\ nominal}$ is a nominal frequency of the crystal oscillator of the communication device, and $T_{2\ system}$ is the system period of the crystal oscillator of the communication device.

Preferably, the decoder is further configured to: whenever the visible light signal is received from the transmit end subsequently, select a corresponding pseudocode signal according to the stored clock information of the transmit end to decode the received visible light signal.

According to another aspect of the embodiments of the present invention, a visible light signal encryption method is further provided, which includes: encrypting data by using a key; and transmitting the encrypted data as a visible light signal, where the key varies with a state of a state machine of a transmit end, or the visible light signal carries indication information used to obtain the key.

Preferably, in a case that the visible light signal carries the indication information, the encrypting data by using a key and transmitting the encrypted data as a visible light signal includes: encoding a generated pseudocode sequence and the data to obtain a pseudocode signal, where the pseudocode sequence is the key; integrating a pseudocode sequence indicator corresponding to the pseudocode sequence into a header of the pseudocode signal to obtain an integrated signal that includes the pseudocode sequence indicator and the pseudocode signal; and sending the integrated signal in a form of visible light.

Preferably, the obtaining an integrated signal that includes the pseudocode sequence indicator and the pseudocode signal, and sending the integrated signal in a form of visible light, include: integrating the pseudocode sequence indicator corresponding to the pseudocode sequence into the header of the pseudocode signal to obtain a first integrated signal; integrating a device addressing code into a header of the first integrated signal to obtain a second integrated signal; and sending the second integrated signal in a form of visible light.

Preferably, before the sending the second integrated signal in a form of a visible light signal, the following is included: modulating the second integrated signal.

Preferably, the pseudocode sequence indicator is a large number that is not cyclic in ascending or descending order, and varies with the number of signal transmission times.

According to another aspect of the embodiments of the present invention, a communication device is further provided, which includes: an encryption device, configured to encrypt data by using a key; and a transmitting unit, configured to transmit the encrypted data as a visible light signal, where the key varies with a state of a state machine of a transmit end, or the visible light signal carries indication information used to obtain the key.

Preferably, the encryption device includes: a pseudocode generator, configured to output a pseudocode sequence and a corresponding pseudocode sequence indicator; a convolutional encoder, configured to perform a logical operation on the pseudocode sequence and the data, and output a pseudocode signal; and a pseudocode sequence indicator integrating unit, configured to integrate the pseudocode sequence indicator into a header of the pseudocode signal, and output an integrated signal that includes the pseudocode sequence indicator and the pseudocode signal, where the pseudocode sequence is the key, and the pseudocode sequence indicator is the indication information; and the transmitting unit is configured to send the integrated signal in a form of a visible light signal.

Preferably, the pseudocode sequence indicator integrating unit is further configured to integrate the pseudocode sequence indicator into the header of the pseudocode signal, and output a first integrated signal; the encryption device further includes a device addressing code integrating unit, configured to integrate a device addressing code into a header of the first integrated signal and output a second integrated signal; and the transmitting unit is configured to send the second integrated signal in a form of a visible light signal.

Preferably, the transmitting device further includes a modulator that is connected between the device addressing code processing unit and the transmitting unit and configured to modulate the second integrated signal.

Preferably, the transmitting unit is an LED lamp.

Preferably, the pseudocode sequence indicator is a large number that is not cyclic in ascending or descending order, and varies with the number of signal transmission times.

According to another aspect of the embodiments of the present invention, a communication system is further provided, which includes: the foregoing communication device.

The present invention solves a problem of decryption failure in visible light encryption and decryption, and improves accuracy of decryption.

BRIEF DESCRIPTION OF DRAWINGS

The accompanying drawings described herein are intended for better understanding of the present invention, and constitute a part of this application. Exemplary embodiments and descriptions thereof in the present invention are intended to interpret the present invention and do not constitute any improper limitation on the present invention. In the accompanying drawings.

EMBODIMENTS

Figure 1:
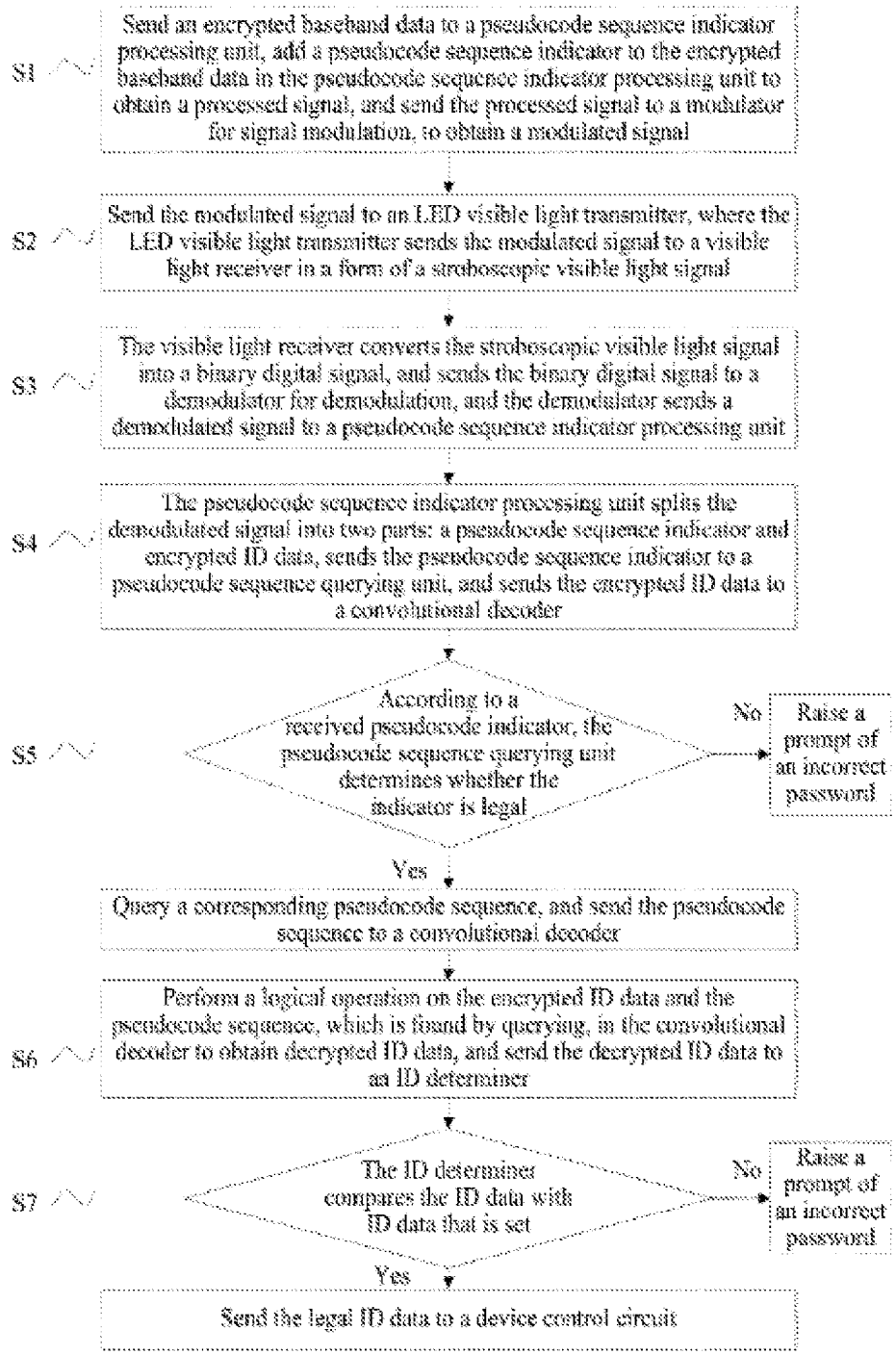
FIG. 1 is a flowchart of a communication method for encrypting visible light asynchronously according to an embodiment of the present invention.

The following describes the embodiments of the present invention in detail with reference to accompanying drawings and embodiments. It should be noted that the embodiments in this application and features in the embodiments may be combined with each other without conflicts.

The following embodiment provides a visible light signal decryption method, including: receiving a visible light signal from a transmit end, where the visible light signal is encrypted at the transmit end by using a key; and obtaining the key, and decrypting the visible light signal according to the key, where the obtaining the key includes: obtaining the key corresponding to a state of a state machine of a receive end; or, obtaining indication information according to the visible light signal and obtaining the key according to the indication information, where the indication information is used to obtain the key.

In the foregoing steps, a key corresponding to a state of the state machine is used, or indication information is used to indicate a key to be used by the receive end, thereby solving a problem of decryption failure that may occur in related technologies.

Preferably, the obtaining indication information according to the visible light signal and obtaining the key according to the indication information, where the indication information is used to obtain the key includes: converting the received visible light signal into a digital signal; decomposing the digital signal into a signal that includes a pseudocode sequence indicator and a pseudocode signal; querying a pseudocode sequence corresponding to the pseudocode sequence indicator, where the pseudocode sequence is the key; and decrypting the pseudocode signal according to the pseudocode sequence.

Preferably, the decomposing the digital signal into a signal that includes a pseudocode sequence indicator and a pseudocode signal, and querying a pseudocode sequence corresponding to the pseudocode sequence indicator includes: decomposing the digital signal into a device addressing code and a first integrated signal; decomposing the first integrated signal into the pseudocode sequence indicator and the pseudocode signal; and determining legality of the pseudocode sequence indicator according to a device addressing code, and if the pseudocode sequence indicator is legal, querying the pseudocode sequence corresponding to the pseudocode sequence indicator.

The following embodiment further provides a communication device. The device includes: a receiver, configured to receive a visible light signal from a transmit end, where the visible light signal is encrypted at the transmit end by using a key; and a decoder, configured to obtain the key, and decrypt the visible light signal according to the key, where the obtaining the key includes: obtaining the key corresponding to a state of a state machine of a receive end; or, obtaining indication information according to the visible light signal and obtaining the key according to the indication information, where the indication information is used to obtain the key.

The following embodiment further provides a visible light signal encryption method, including: encrypting data by using a key; and transmitting the encrypted data as a visible light signal, where the key varies with a state of a state machine of a transmit end, or the visible light signal carries indication information used to obtain the key.

In the encryption method, a light signal is used to carry indication information, or a key corresponding to a state of a state machine is used, thereby solving a problem of decryption failure that may occur in related technologies.

Preferably, in a case that the visible light signal carries the indication information, the encrypting data by using the key and transmitting the encrypted data as the visible light signal includes: encoding a generated pseudocode sequence and the data to obtain a pseudocode signal, where the pseudocode sequence is the key; integrating a pseudocode sequence indicator corresponding to the pseudocode sequence into a header of the pseudocode signal to obtain an integrated signal that includes the pseudocode sequence indicator and the pseudocode signal; and sending the integrated signal in a form of visible light.

Preferably, the obtaining an integrated signal that includes the pseudocode sequence indicator and the pseudocode signal, and sending the integrated signal in a form of visible light includes: integrating the pseudocode sequence indicator corresponding to the pseudocode sequence into the header of the pseudocode signal to obtain a first integrated signal; and integrating a device addressing code into a header of the first integrated signal to obtain a second integrated signal; and sending the second integrated signal in a form of visible light.

The following embodiment further provides a communication device, including: an encryption device, configured to encrypt data by using a key; and a transmitting unit, configured to transmit the encrypted data as a visible light signal, where the key varies with a state of a state machine of a transmit end, or the visible light signal carries indication information used to obtain the key.

Preferably, the encryption device includes: a pseudocode generator, configured to output a pseudocode sequence and a corresponding pseudocode sequence indicator; a convolutional encoder, configured to perform a logical operation on the pseudocode sequence and the data, and output a pseudocode signal; and a pseudocode sequence indicator integrating unit, configured to integrate the pseudocode sequence indicator into a header of the pseudocode signal, and output an integrated signal that includes the pseudocode sequence indicator and the pseudocode signal, where the pseudocode sequence is the key, and the pseudocode sequence indicator is the indication information; and the transmitting unit is configured to send the integrated signal in a form of a visible light signal.

Preferably, the pseudocode sequence indicator integrating unit is configured to integrate the pseudocode sequence indicator into the header of the pseudocode signal, and output a pseudocode sequence indicator of a first integrated signal. The device further includes: a device addressing code integrating unit, configured to integrate a device addressing code into a header of the first integrated signal and output a second integrated signal. In this case, the transmitting unit is configured to send the second integrated signal in a form of a visible light signal.

The following gives descriptions with reference to four exemplary embodiments.

Technical features in the four exemplary embodiments may be combined for use.

Embodiment 1

According to FIG. 1 which shows a schematic flowchart of a communication method for encrypting visible light asynchronously according to this embodiment, a communication method for encrypting visible light asynchronously includes the following steps:

S1. Perform a logical operation on baseband data and a pseudocode sequence generated by a pseudocode generator 101 in a convolutional encoder 102 to obtain encrypted data (for example, the data may include ID data, and the encrypted data may also be a pseudocode signal, and the following description uses ID data as an example), send the encrypted ID data to a pseudocode sequence indicator processing unit 103, add a pseudocode sequence indicator into the ID data, and then send the ID data to a modulator 104 to perform signal modulation.

S2. Send a modulated signal to an LED 105, and the LED 105 transmits the modulated signal to a visible light receiver in a form of a stroboscopic visible light signal.

S3. The visible light receiver 201 converts the stroboscopic visible light signal into a binary digital signal, and sends the binary digital signal to a demodulator 202 for demodulation, and the demodulator 202 sends a demodulated signal to a pseudocode sequence indicator processing unit 203.

S4. The pseudocode sequence indicator processing unit 203 splits the demodulated signal into two parts: a pseudocode sequence indicator and encrypted ID data, sends the pseudocode sequence indicator to a pseudocode sequence querying unit 204, and sends the encrypted ID data to a convolutional decoder 205.

S5. The pseudocode sequence querying unit 204 determines, according to a received pseudocode sequence indicator, whether the pseudocode sequence indicator is legal; if the pseudocode sequence indicator is legal, queries the corresponding pseudocode sequence and sends the pseudocode sequence to the convolutional decoder 205; or, if the pseudocode sequence indicator is illegal, give a prompt of an incorrect password.

S6. Perform an XOR operation on the encrypted ID data and the pseudocode sequence, which is found by querying, in the convolutional decoder 205 to obtain decrypted ID data, and send the decrypted ID data to an ID determiner 206.

S7. The ID determiner 206 compares the ID data with ID data that is set; if the same, determines that the ID data is legal and sends the legal ID data to a device control circuit 207; and if different, raises a prompt of an incorrect password.

Original data is a digital sequence signal and also called baseband data, and in this exemplary embodiment, is primarily formed of ID data. The ID data refers to a unique identifier of each user. According to the decrypted ID data, a device control circuit of a receive end determines whether a corresponding right is available, and thus determines whether the device can be controlled.

The pseudocode sequence is a binary digital sequence generated by a pseudocode generator, and may be a digital sequence such as PN codes, Turbo codes, Walsh codes, and Barker codes, or may be a binary digital sequence defined by a user.

The pseudocode sequence indicator is a natural number indicating a state of a corresponding unit state machine, and is used to indicate which pseudocode sequence is used by the transmit end and the receive end to perform encryption and decryption. For example, when the pseudocode sequence indicator is a binary numeral 00000100, the pseudocode sequence indicator is expressed by a decimal numeral 4, which represents that the state of its unit state machine is 4, and a pseudocode sequence corresponding to the pseudocode sequence indicator is 1010110110011100; and when the pseudocode sequence indicator is a binary numeral 00000101, the pseudocode sequence indicator is expressed by a decimal numeral 5, which represents that the state of its unit state machine is 5, and the pseudocode sequence indicator corresponds to another pseudocode sequence 1010110110011001, and so on. Different pseudocode sequence indicators correspond to different pseudocode sequences, and a one-to-one correspondence exists between the pseudocode sequence indicator and the pseudocode sequence. The pseudocode sequence indicator is arranged according to an ascending or descending order rule. In the ascending order rule, the pseudocode sequence indicator increases by 1 whenever the transmit end sends a signal; and, in the descending order rule, the pseudocode sequence indicator decreases by 1 whenever the transmit end sends a signal. The pseudocode sequence indicator is used to instruct the transmit end and the receive end to use the corresponding pseudocode sequence to perform encryption and decryption. The pseudocode sequence indicator increases by 1 automatically (or decreases by 1 automatically) whenever the transmit end sends a signal.

In an exemplary embodiment of the present invention, the logical operation is logical XOR, or may be another operation manner, such as logical NOR or logical XNOR.

It should be understood that the visible light signal transmitted by the transmit end and the receive end in the communication method for encrypting visible light asynchronously in this embodiment is not the original data, but a scrambled signal after encryption. Scrambling code is data generated after a specific logical operation is performed on the original data, for example, a convolution or shift operation is performed on the original data and the pseudocode sequence.

This embodiment further provides a communication system for encrypting visible light asynchronously, which includes a transmit end and a receive end. The transmit end communicates with the receive end according to the foregoing communication method for encrypting visible light asynchronously.

Figure 2:
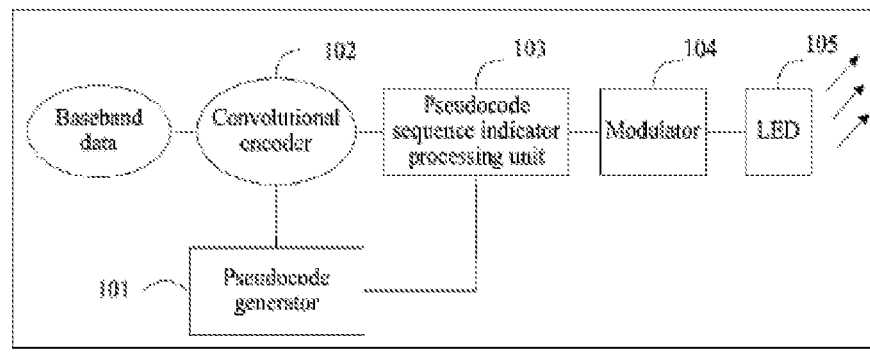
FIG. 2 is a schematic structural diagram of a communication system transmit end for encrypting visible light asynchronously according to an embodiment of the present invention.

Referring to FIG. 2, FIG. 2 is a schematic structural diagram of a communication system transmit end for encrypting visible light asynchronously according to this embodiment, the transmit end in this embodiment includes a pseudocode generator 101 configured to generate a pseudocode sequence indicator, a convolutional encoder 102 for encoding, a pseudocode sequence indicator processing unit 103 configured to process a pseudocode sequence indicator, and an LED 105 configured to transmit a visible light signal, and the transmit end further includes a modulator 104 configured to modulate a signal.

Figure 3:
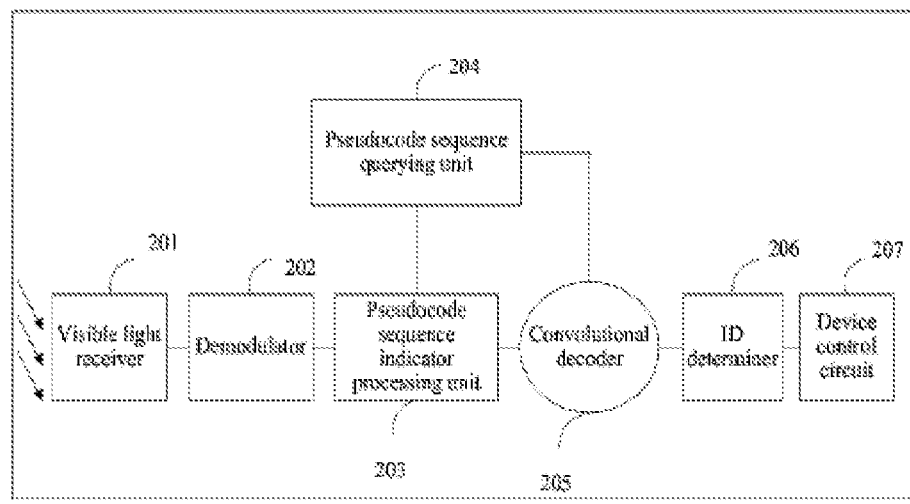
FIG. 3 is a schematic structural diagram of a communication system receive end for encrypting visible light asynchronously according to an embodiment of the present invention.

Referring to FIG. 3, FIG. 3 is a schematic structural diagram of a communication system receive end for encrypting visible light asynchronously according to this embodiment, the receive end in this embodiment includes a visible light receiver 201 configured to receive a visible light signal, a pseudocode sequence indicator processing unit 203 configured to obtain a pseudocode sequence indicator and encrypted ID data, a pseudocode sequence querying unit 204 configured to output a pseudocode sequence, a convolutional decoder 205 for decoding, an ID determiner 206 configured to output ID data, and a device control circuit 207. The receive end further includes a demodulator 202 configured to demodulate a signal.

It should be understood that a prompt of an incorrect password may be raised by, but without being limited to, a buzzer or a signal lamp.

Figure 4:
FIG. 4 is a schematic structural diagram of transmitting a signal according to an embodiment of the present invention.

Referring to FIG. 4, FIG. 4 is a schematic structural diagram of a transmitted signal according to this embodiment, transmitted signal data in this embodiment is primarily formed of two parts: a pseudocode sequence indicator and encrypted ID data. It is assumed that the ID data set at the transmit end and the receive end is a 16-bit binary numeral 0000000000000100, the pseudocode sequence indicator is an 8-bit binary numeral 00000010, and a pseudocode sequence corresponding to the pseudocode sequence indicator is a 16-bit binary numeral 1010101100100010, then:

S1. Perform an XOR operation on baseband data and a pseudocode sequence generated by a pseudocode generator 101 in a convolutional encoder 102 to obtain encrypted ID data. Operation results are listed in the following table:

| Baseband data | 0 | 0 | 0 | 0 | 0 | 0 | 0 | 0 | 0 | 0 | 0 | 0 | 0 | 1 | 0 | 0 |
|---|---|---|---|---|---|---|---|---|---|---|---|---|---|---|---|---|
| Pseudocode sequence | 1 | 0 | 1 | 0 | 1 | 0 | 1 | 1 | 0 | 0 | 1 | 0 | 0 | 0 | 1 | 0 |
| XOR operation output | 1 | 0 | 1 | 0 | 1 | 0 | 1 | 1 | 0 | 0 | 1 | 0 | 0 | 1 | 1 | 0 |

The foregoing table shows that the encrypted ID data is 1010101100100110, which is different from the original ID data. That is, the original data is encrypted.

Send the encrypted ID data to the pseudocode sequence indicator processing unit 103. Add a pseudocode sequence indicator 00000010 as a header to the encrypted ID data. After the pseudocode sequence indicator is added, send the data to a modulator 104 to perform signal modulation. An output digital sequence is 000000101010101100100110.

S2. Send the modulated signal to an LED 105, and the LED 105 transmits the modulated signal 000000101010101100100110 to a visible light receiver in a form of a stroboscopic visible light signal.

S3. The visible light receiver 201 converts the stroboscopic visible light signal into a binary digital signal, and sends the binary digital signal to a demodulator 202 for demodulation, and the demodulator 202 sends a demodulated signal to a pseudocode sequence indicator processing unit 203.

S4. The pseudocode sequence indicator processing unit 203 splits the demodulated signal 000000101010101100100110 into two parts: a pseudocode sequence indicator 00000010 and encrypted ID data 1010101100100110, sends the pseudocode sequence indicator 00000010 to a pseudocode sequence querying unit 204, and sends the encrypted ID data 1010101100100110 to a convolutional decoder 205.

S5. The pseudocode sequence querying unit 204 inputs a pseudocode sequence indicator 00000010, and the pseudocode sequence querying unit 204 compares a previously stored pseudocode sequence indicator with a currently received pseudocode sequence indicator, and, according to the received pseudocode sequence indicator, determines whether the pseudocode sequence indicator is legal. When the pseudocode sequence indicator is arranged according to an ascending order rule (the pseudocode sequence indicator increases by 1 whenever the transmit end sends a signal), if the currently received pseudocode sequence indicator is greater than the stored pseudocode sequence indicator, the currently received signal is a legal signal, and the received pseudocode sequence is sent to a convolutional decoder 205; otherwise, the currently received signal is an illegal signal, and a prompt of an incorrect password is raised.

In addition, when a descending order rule (the pseudocode sequence indicator decreases by 1 whenever the transmit end sends a signal) is applied, if the currently received pseudocode sequence indicator is less than the stored pseudocode sequence indicator, the currently received signal is a legal signal, and the received pseudocode sequence is sent to the convolutional decoder 205; otherwise, the currently received signal is an illegal signal, and a prompt of an incorrect password is raised.

S6. Perform an XOR operation on the encrypted ID data 1010101100100110 and the found pseudocode sequence 1010101100100010 in the convolutional decoder 205. Operation results are listed in the following table:

The foregoing table shows that the decrypted ID data is 0000000000000100, which is sent to an ID determiner 206.

S7. The ID determiner 206 compares the received decrypted ID data with the set ID data; if the same, determines that the ID data is legal and sends the legal ID data to a device control circuit 207; and if different, which indicates an illegal ID data, raises a prompt of an incorrect password. By now, the signal received by the ID determiner 206 is 0000000000000100, and the ID data set by the receive end is also 0000000000000100. Therefore, the received signal is a legal signal, and the receive end successfully decrypts the encrypted signal sent by the transmit end.

This embodiment can prevent a high-speed camera from shooting a visible light signal and replicating the visible light signal, for example, prevent the encrypted ID data sent in this embodiment from being shot and replicated by the high-speed camera in a process of communication between the transmit end and the receive end, where the replicated signal is an air interface signal 000000101010101100100110. When receiving a legal signal, the receive end already stores the pseudocode sequence indicator as 00000010 in the legal signal. When further receiving a replicated signal, the receive end also obtains 00000010 by separating the pseudocode sequence indicator in the replicated signal. However, according to an ascending order rule of encryption, a subsequently received pseudocode sequence indicator should be greater than 00000010 (or, when a descending order rule is applied, should be less than 00000010), but in a replicated signal, the two are equal. Therefore, it can be determined that the replicated signal is an illegal signal, and a prompt of an incorrect password is raised.

Preferably, it is assumed that a high-speed camera photographs a visible light signal, replicates the visible light signal, and fakes a new signal by means of modification, that is, by modifying the pseudocode sequence indicator in the signal to 00000011 and keeping the remaining part unchanged. When the pseudocode sequence indicator is arranged according to an ascending order rule, the pseudocode sequence querying unit 204 determines that it is a legal signal, and queries a pseudocode sequence corresponding to the pseudocode sequence indicator 00000011. The pseudocode sequence is different from the encrypted pseudocode sequence. Assuming that the pseudocode sequence querying unit finds, by querying, that the corresponding pseudocode sequence is 1010101100100011, the ID data is decrypted by using the pseudocode sequence, and an operation process is shown in the following table:

| Encrypted ID data | 1 | 0 | 1 | 0 | 1 | 0 | 1 | 1 | 0 | 0 | 1 | 0 | 0 | 1 | 1 | 0 |
|---|---|---|---|---|---|---|---|---|---|---|---|---|---|---|---|---|
| Pseudocode sequence | 1 | 0 | 1 | 0 | 1 | 0 | 1 | 1 | 0 | 0 | 1 | 0 | 0 | 0 | 1 | 0 |
| XOR operation output | 0 | 0 | 0 | 0 | 0 | 0 | 0 | 0 | 0 | 0 | 0 | 0 | 0 | 1 | 0 | 0 |

| Encrypted ID data | 1 | 0 | 1 | 0 | 1 | 0 | 1 | 1 | 0 | 0 | 1 | 0 | 0 | 1 | 1 | 0 |
|---|---|---|---|---|---|---|---|---|---|---|---|---|---|---|---|---|
| Pseudocode sequence | 1 | 0 | 1 | 0 | 1 | 0 | 1 | 1 | 0 | 0 | 1 | 0 | 0 | 0 | 1 | 1 |
| XOR operation output | 0 | 0 | 0 | 0 | 0 | 0 | 0 | 0 | 0 | 0 | 0 | 0 | 0 | 1 | 0 | 1 |

The foregoing table shows that the decrypted ID data of the faked signal is 0000000000000101, and the ID data that is set by the receive end is 0000000000000100. The two have different IDs, and the ID determiner 206 determines that the received signal is an illegal signal, and raises a prompt of an incorrect password.

It is assumed that the ID data set at the transmit end and the receive end is a 16-bit binary numeral 0000000000000010, the pseudocode sequence indicator is an 8-bit binary numeral 00000100, and a pseudocode sequence corresponding to the pseudocode sequence indicator is a 16-bit binary numeral 1010101100100010, then:

S1. Perform an XOR operation on baseband data and a pseudocode sequence generated by a pseudocode generator 101 in a convolutional encoder 102 to obtain encrypted ID data. Operation results are listed in the following table:

| Baseband data | 0 | 0 | 0 | 0 | 0 | 0 | 0 | 0 | 0 | 0 | 0 | 0 | 0 | 0 | 1 | 0 |
|---|---|---|---|---|---|---|---|---|---|---|---|---|---|---|---|---|
| Pseudocode sequence | 1 | 0 | 1 | 0 | 1 | 0 | 1 | 1 | 0 | 0 | 1 | 0 | 0 | 0 | 1 | 0 |
| XOR operation output | 1 | 0 | 1 | 0 | 1 | 0 | 1 | 1 | 0 | 0 | 1 | 0 | 0 | 0 | 0 | 0 |

The foregoing table shows that the encrypted ID data is 1010101100100000, which is different from the original ID data. That is, the original data is encrypted.

Send the encrypted ID data to the pseudocode sequence indicator processing unit 103. Add a pseudocode sequence indicator 00000010 as a header to the encrypted ID data. After the pseudocode sequence indicator is added, send the data to a modulator 104 to perform signal modulation. An output digital sequence is 000000101010101100100000.

S2. Send the modulated signal to an LED 105, and the LED 105 transmits the modulated signal 000000101010101100100000 to a visible light receiver in a form of a stroboscopic visible light signal.

S3. The visible light receiver 201 converts the stroboscopic visible light signal into a binary digital signal, and sends the binary digital signal to a demodulator 202 for demodulation, and the demodulator 202 sends a demodulated signal to a pseudocode sequence indicator processing unit 203.

S4. The pseudocode sequence indicator processing unit 203 splits the demodulated signal 000000101010101100100000 into two parts: a pseudocode sequence indicator 00000010 and encrypted ID data 1010101100100000, sends the pseudocode sequence indicator 00000010 to a pseudocode sequence querying unit 204, and sends the encrypted ID data 1010101100100000 to a convolutional decoder 205.

S5. The pseudocode sequence querying unit 204 inputs a pseudocode sequence indicator 00000010, and the pseudocode sequence querying unit 204 compares a previously stored pseudocode sequence indicator with a currently received pseudocode sequence indicator, and, according to the received pseudocode sequence indicator, determines whether the pseudocode sequence indicator is legal. When the pseudocode sequence indicator is arranged according to an ascending order rule (the pseudocode sequence indicator increases by 1 whenever the transmit end sends a signal), if the currently received pseudocode sequence indicator is greater than the stored pseudocode sequence indicator, the currently received signal is a legal signal, and the received pseudocode sequence is sent to a convolutional decoder 205; otherwise, the currently received signal is an illegal signal, and a prompt of an incorrect password is raised.

In addition, when a descending order rule (the pseudocode sequence indicator decreases by 1 whenever the transmit end sends a signal) is applied, if the currently received pseudocode sequence indicator is less than the stored pseudocode sequence indicator, the currently received signal is a legal signal, and the received pseudocode sequence is sent to the convolutional decoder 205; otherwise, the currently received signal is an illegal signal, and a prompt of an incorrect password is raised.

S6. Perform an XOR operation on the encrypted ID data 1010101100100000 and the found pseudocode sequence 1010101100100010 in the convolutional decoder 205. Operation results are listed in the following table:

| Encrypted ID data | 1 | 0 | 1 | 0 | 1 | 0 | 1 | 1 | 0 | 0 | 1 | 0 | 0 | 0 | 0 | 0 |
|---|---|---|---|---|---|---|---|---|---|---|---|---|---|---|---|---|
| Pseudocode sequence | 1 | 0 | 1 | 0 | 1 | 0 | 1 | 1 | 0 | 0 | 1 | 0 | 0 | 0 | 1 | 0 |
| XOR operation output | 0 | 0 | 0 | 0 | 0 | 0 | 0 | 0 | 0 | 0 | 0 | 0 | 0 | 0 | 1 | 0 |

The foregoing table shows that the decrypted ID data is 0000000000000010, which is sent to an ID determiner 206.

S7. The ID determiner 206 compares the received decrypted ID data with the set ID data; if the same, determines that the ID data is legal and sends the legal ID data to a device control circuit 207; and if different, which indicates an illegal ID data, raises a prompt of an incorrect password. By now, the signal received by the ID determiner 206 is 0000000000000010, and the ID data set by the receive end is also 0000000000000010. Therefore, the received signal is a legal signal, and the receive end successfully decrypts the encrypted signal sent by the transmit end.

It is assumed that the ID data set at the transmit end and the receive end is a 16-bit binary numeral 0000000000000011, the pseudocode sequence indicator is an 8-bit binary numeral 00000010, and a pseudocode sequence corresponding to the pseudocode sequence indicator is a 16-bit binary numeral 0000000000100000, then:

S1. Perform a NOR operation on baseband data and a pseudocode sequence generated by a pseudocode generator 101 in a convolutional encoder 102 to obtain encrypted ID data. Operation results are listed in the following table:

| Baseband data | 0 | 0 | 0 | 0 | 0 | 0 | 0 | 0 | 0 | 0 | 0 | 0 | 0 | 0 | 1 | 1 |
|---|---|---|---|---|---|---|---|---|---|---|---|---|---|---|---|---|
| Pseudocode sequence | 0 | 0 | 0 | 0 | 0 | 0 | 0 | 0 | 0 | 0 | 1 | 0 | 0 | 0 | 0 | 0 |
| NOR operation output | 1 | 1 | 1 | 1 | 1 | 1 | 1 | 1 | 1 | 1 | 0 | 1 | 1 | 1 | 0 | 0 |

The foregoing table shows that the encrypted ID data is 1111111111011100, which is different from the original ID data. That is, the original data is encrypted.

Send the encrypted ID data to the pseudocode sequence indicator processing unit 103. Add a pseudocode sequence indicator 00000010 as a header to the encrypted ID data. After the pseudocode sequence indicator is added, send the data to a modulator 104 to perform signal modulation. An output digital sequence is 000000101111111111011100.

S2. Send the modulated signal to an LED 105, and the LED 105 transmits the modulated signal 000000101111111111011100 to a visible light receiver in a form of a stroboscopic visible light signal.

S3. A visible light receiver 201 converts the stroboscopic visible light signal into a binary digital signal, and sends the binary digital signal to a demodulator 202 for demodulation, and the demodulator 202 sends a demodulated signal to a pseudocode sequence indicator processing unit 203.

S4. The pseudocode sequence indicator processing unit 203 splits the demodulated signal 000000101111111111011100 into two parts: a pseudocode sequence indicator 00000010 and encrypted ID data 1111111111011100, sends the pseudocode sequence indicator 00000010 to a pseudocode sequence querying unit 204, and sends the encrypted ID data 1111111111011100 to a convolutional decoder 205.

S5. The pseudocode sequence querying unit 204 inputs a pseudocode sequence indicator 00000010, and the pseudocode sequence querying unit 204 compares a previously stored pseudocode sequence indicator with a currently received pseudocode sequence indicator, and, according to the received pseudocode sequence indicator, determines whether the pseudocode sequence indicator is legal. When the pseudocode sequence indicator is arranged according to an ascending order rule (the pseudocode sequence indicator increases by 1 whenever the transmit end sends a signal), if the currently received pseudocode sequence indicator is greater than the stored pseudocode sequence indicator, the currently received signal is a legal signal, and the received pseudocode sequence is sent to a convolutional decoder 205; otherwise, the currently received signal is an illegal signal, and a prompt of an incorrect password is raised.

In addition, when a descending order rule (the pseudocode sequence indicator decreases by 1 whenever the transmit end sends a signal) is applied, if the currently received pseudocode sequence indicator is less than the stored pseudocode sequence indicator, the currently received signal is a legal signal, and the received pseudocode sequence is sent to the convolutional decoder 205; otherwise, the currently received signal is an illegal signal, and a prompt of an incorrect password is raised.

S6. Perform a NOR operation on the encrypted ID data 1111111111011100 and the found pseudocode sequence 0000000000100000 in the convolutional decoder 205. Operation results are listed in the following table:

| Encrypted ID data | 1 | 1 | 1 | 1 | 1 | 1 | 1 | 1 | 1 | 1 | 0 | 1 | 1 | 1 | 0 | 0 |
|---|---|---|---|---|---|---|---|---|---|---|---|---|---|---|---|---|
| Pseudocode sequence | 0 | 0 | 0 | 0 | 0 | 0 | 0 | 0 | 0 | 0 | 1 | 0 | 0 | 0 | 0 | 0 |
| NOR operation output | 0 | 0 | 0 | 0 | 0 | 0 | 0 | 0 | 0 | 0 | 0 | 0 | 0 | 0 | 1 | 1 |

The foregoing table shows that the decrypted ID data is 0000000000000011, which is sent to an ID determiner 206.

S7. The ID determiner 206 compares the received decrypted ID data with the set ID data; if the same, determines that the ID data is legal and sends the legal ID data to a device control circuit 207; and if different, which indicates an illegal ID data, raises a prompt of an incorrect password. By now, the signal received by the ID determiner 206 is 0000000000000011, and the ID data set by the receive end is also 0000000000000011. Therefore, the received signal is a legal signal, and the receive end successfully decrypts the encrypted signal sent by the transmit end.

It is assumed that the ID data set at the transmit end and the receive end is a 16-bit binary numeral 0000000000010000, the pseudocode sequence indicator is an 8-bit binary numeral 10000000, and a pseudocode sequence corresponding to the pseudocode sequence indicator is a 16-bit binary numeral 0000100000000000, then:

S1. Perform an XNOR operation on baseband data and a pseudocode sequence generated by a pseudocode generator 101 in a convolutional encoder 102 to obtain encrypted ID data. Operation results are listed in the following table:

| Baseband data | 0 | 0 | 0 | 0 | 0 | 0 | 0 | 0 | 0 | 0 | 0 | 1 | 0 | 0 | 0 | 0 |
|---|---|---|---|---|---|---|---|---|---|---|---|---|---|---|---|---|
| Pseudocode sequence | 0 | 0 | 0 | 0 | 1 | 0 | 0 | 0 | 0 | 0 | 0 | 0 | 0 | 0 | 0 | 0 |
| XNOR operation output | 1 | 1 | 1 | 1 | 0 | 1 | 1 | 1 | 1 | 1 | 1 | 0 | 1 | 1 | 1 | 1 |

The foregoing table shows that the encrypted ID data is 1111011111101111, which is different from the original ID data. That is, the original data is encrypted.

Send the encrypted ID data to the pseudocode sequence indicator processing unit 103. Add a pseudocode sequence indicator 10000000 as a header to the encrypted ID data. After the pseudocode sequence indicator is added, send the data to a modulator 104 to perform signal modulation. An output digital sequence is 100000001111011111101111.

S2. Send the modulated signal to an LED 105, and the LED 105 transmits the modulated signal 100000001111011111101111 to a visible light receiver in a form of a stroboscopic visible light signal.

S3. A visible light receiver 201 converts the stroboscopic visible light signal into a binary digital signal, and sends the binary digital signal to a demodulator 202 for demodulation, and the demodulator 202 sends a demodulated signal to a pseudocode sequence indicator processing unit 203.

S4. The pseudocode sequence indicator processing unit 203 splits the demodulated signal 100000001111011111101111 into two parts: a pseudocode sequence indicator 10000000 and encrypted ID data 1111011111101111, sends the pseudocode sequence indicator 10000000 to a pseudocode sequence querying unit 204, and sends the encrypted ID data 1111011111101111 to a convolutional decoder 205.

S5. The pseudocode sequence querying unit 204 inputs a pseudocode sequence indicator 10000000, and the pseudocode sequence querying unit 204 compares a previously stored pseudocode sequence indicator with a currently received pseudocode sequence indicator, and, according to the received pseudocode sequence indicator, determines whether the pseudocode sequence indicator is legal. When the pseudocode sequence indicator is arranged according to an ascending order rule (the pseudocode sequence indicator increases by 1 whenever the transmit end sends a signal), if the currently received pseudocode sequence indicator is greater than the stored pseudocode sequence indicator, the currently received signal is a legal signal, and the received pseudocode sequence is sent to a convolutional decoder 205; otherwise, the currently received signal is an illegal signal, and a prompt of an incorrect password is raised.

In addition, when a descending order rule (the pseudocode sequence indicator decreases by 1 whenever the transmit end sends a signal) is applied, if the currently received pseudocode sequence indicator is less than the stored pseudocode sequence indicator, the currently received signal is a legal signal, and the received pseudocode sequence is sent to the convolutional decoder 205; otherwise, the currently received signal is an illegal signal, and a prompt of an incorrect password is raised.

S6. Perform an XNOR operation on the encrypted ID data 1111011111101111 and the found pseudocode sequence 0000100000000000 in the convolutional decoder 205. Operation results are listed in the following table:

| Encrypted ID data | 1 | 1 | 1 | 1 | 0 | 1 | 1 | 1 | 1 | 1 | 1 | 0 | 1 | 1 | 1 | 1 |
| Pseudocode sequence | 0 | 0 | 0 | 0 | 1 | 0 | 0 | 0 | 0 | 0 | 0 | 0 | 0 | 0 | 0 | 0 |
| XNOR operation output | 0 | 0 | 0 | 0 | 0 | 0 | 0 | 0 | 0 | 0 | 0 | 1 | 0 | 0 | 0 | 0 |

The foregoing table shows that the decrypted ID data is 0000000000010000, which is sent to an ID determiner 206.

S7. The ID determiner 206 compares the received decrypted ID data with the set ID data; if the same, determines that the ID data is legal and sends the legal ID data to a device control circuit 207; and if different, which indicates an illegal ID data, raises a prompt of an incorrect password. By now, the signal received by the ID determiner 206 is 0000000000010000, and the ID data set by the receive end is also 0000000000010000. Therefore, the received signal is a legal signal, and the receive end successfully decrypts the encrypted signal sent by the transmit end.

In conclusion, the communication method and system for encrypting visible light asynchronously according to this embodiment are technically simpler and more cost-efficient than a synchronous encryption method, do not require a transmit end and a receive end to have the same clock, and can prevent a high-speed camera from shooting a visible light signal and replicating the visible light signal which leads to password leakage, and improve security performance of a photonic Internet of things significantly. This embodiment is applicable to a photon lock and a photon access control system.

Embodiment 2

Figure 5:
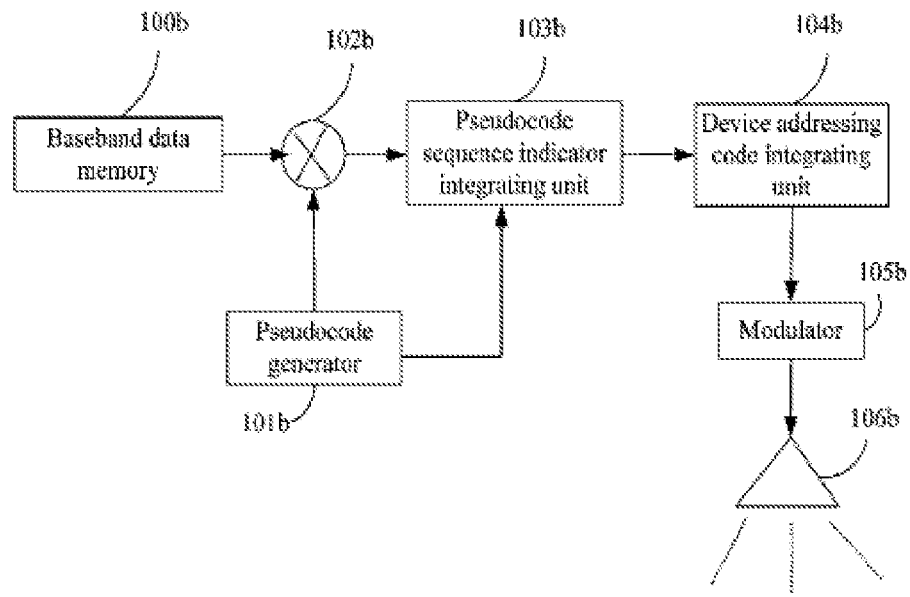
FIG. 5 is a schematic structural diagram of a transmitting device based on multi-user asynchronous encryption according to an embodiment of the present invention.

Referring to FIG. 5, FIG. 5 is a schematic structural diagram of a transmitting device based on multi-user asynchronous encryption according to this embodiment of the present invention. The transmitting device includes a baseband data memory 100b, a pseudocode generator 101b, a convolutional encoder 102b, a pseudocode sequence indicator integrating unit 103b, a device addressing code integrating unit 104b, a modulator 105b, and a visible light transmitting unit 106b. The baseband data memory 100b is configured to store ID information, where the ID information is data used to represent a user identity; the pseudocode generator 101b is configured to provide a pseudocode sequence for the convolutional encoder 102b, and provide a pseudocode sequence indicator for the pseudocode sequence indicator integrating unit 103b; the convolutional encoder 102b is configured to perform a logical operation on the pseudocode sequence and the ID information of the transmitting device and output a pseudocode signal; the pseudocode sequence indicator integrating unit 103b is configured to add the pseudocode sequence indicator to the pseudocode signal output by the convolutional encoder 102b to obtain a first integrated signal, and then output the first integrated signal to the device addressing code integrating unit 104b; the device addressing code integrating unit 104b is configured to add a device addressing code to a header of the first integrated signal transmitted by the convolutional encoder 102b, and output a second integrated signal; and the modulator 105b is configured to modulate the second integrated signal output by the device addressing code integrating unit 104b, transmit the second integrated signal to the visible light transmitting unit 106b, and transmit the second integrated signal in a form of visible light.

The transmitting unit 106b is an LED lamp.

Figure 6:
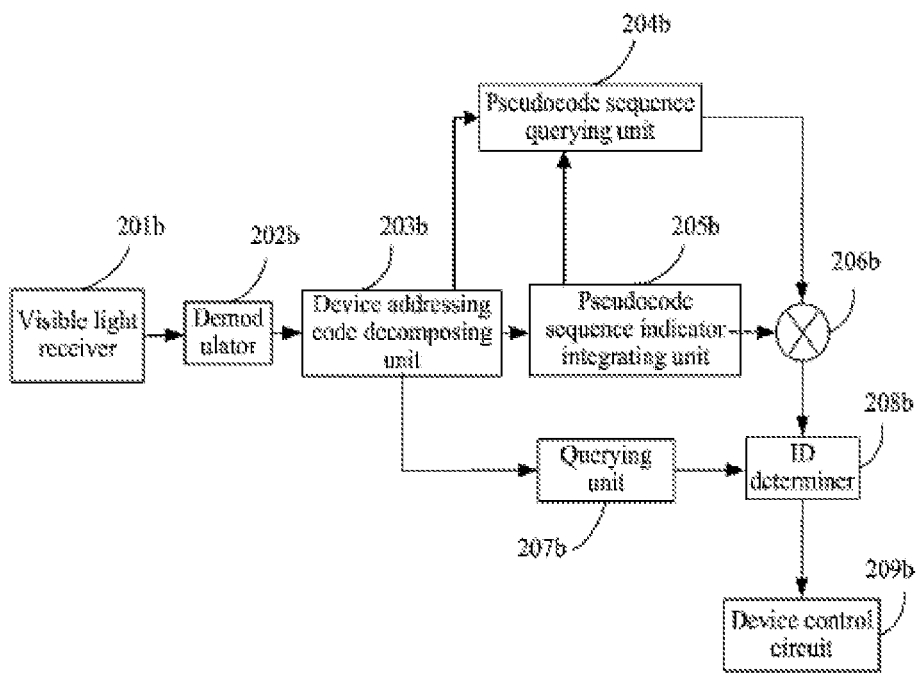
FIG. 6 is a schematic structural diagram of a receiving device based on multi-user asynchronous encryption according to an embodiment of the present invention.

Referring to FIG. 6, FIG. 6 is a schematic structural diagram of a receiving device based on multi-user asynchronous encryption according to Embodiment 2 of the present invention, the receiving device includes a visible light receiver 201b, a demodulator 202b, a device addressing code decomposing unit 203b, a pseudocode sequence querying unit 204b, a pseudocode sequence indicator decomposing unit 205b, a convolutional decoder 206b, a querying unit 207b, an ID determiner 208b, and a device control circuit 209b. The visible light receiver 201b is configured to convert a light signal transmitted by the transmitting device into an electrical signal, and convert the electrical signal into a digital signal; the demodulator 202b is configured to demodulate the digital signal output by the visible light receiver 201b; the device addressing code decomposing unit 203b is configured to separate a device addressing code and a first integrated signal from the signal output by the demodulator 202b; the pseudocode sequence querying unit 204b is configured to output a corresponding pseudocode sequence according to the device addressing code; the pseudocode sequence indicator decomposing unit 205b is configured to decompose the first integrated signal output by the device addressing code decomposing unit 203b into a pseudocode sequence indicator and a pseudocode signal, and transmit the pseudocode sequence indicator and the pseudocode signal to the pseudocode sequence querying unit 204b and the convolutional decoder 206b separately; the querying unit 207b is configured to determine legality of the pseudocode sequence indicator of a current signal according to the device addressing code; the convolutional decoder 206b is configured to perform a logical operation on the pseudocode sequence output by the pseudocode sequence querying unit 204b and the pseudocode signal, and output ID information; the ID determiner 208b is configured to determine whether the ID information output by the convolutional decoder 206 is the same as that output by the querying unit 207b; and if the same, transmit the ID information to the device controller; and the device control circuit 209b is configured to control a corresponding device or communicate with a host computer according to the signal output by the ID determiner 208b.

The foregoing embodiments describe the transmitting device and the receiving device based on multi-user asynchronous encryption, and the following describes a transmitting method and a receiving method based on multi-user asynchronous encryption.

Figure 7:
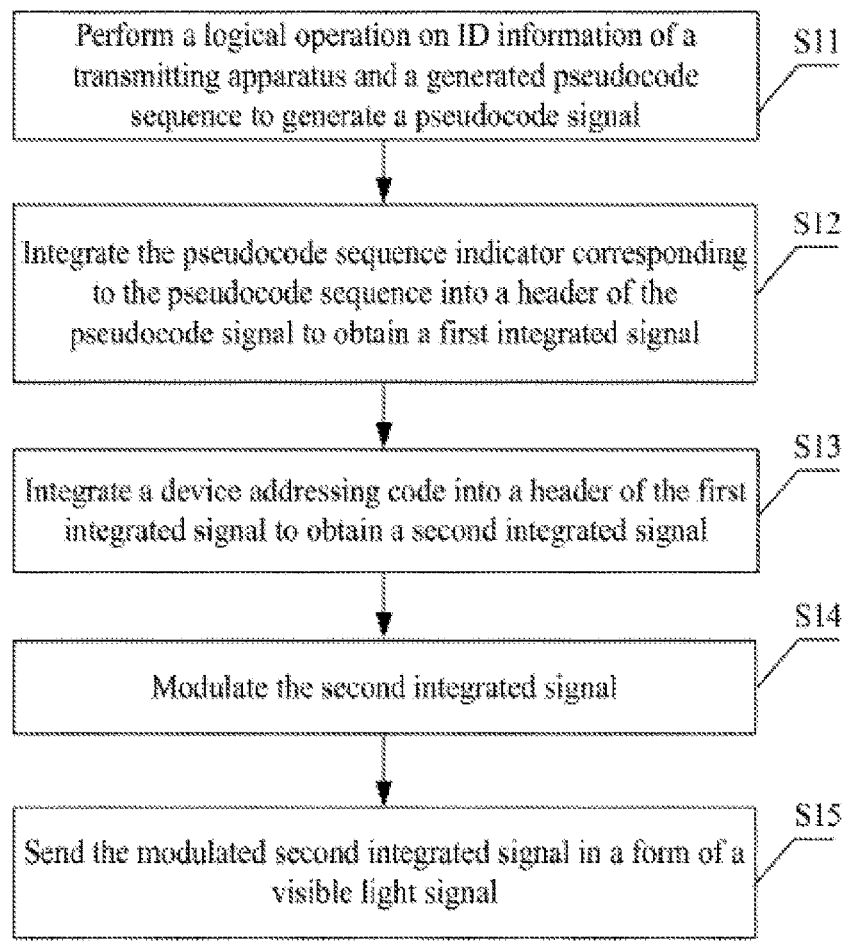
FIG. 7 is a flowchart of a transmitting method based on multi-user asynchronous encryption according to an embodiment of the present invention.

Referring to FIG. 7, FIG. 7 is a flowchart of a transmitting method based on multi-user asynchronous encryption according to Embodiment 3 of the present invention. The transmitting method includes:

S11. Perform a logical operation on ID information of a transmitting device and a generated pseudocode sequence to generate a pseudocode signal.

S12. Integrate a pseudocode sequence indicator corresponding to the pseudocode sequence into a header of the pseudocode signal to obtain a first integrated signal.

The pseudocode sequence indicator is a large number that is not cyclic in ascending or descending order, and varies with the number of signal transmission times. For example, the pseudocode sequence indicator increases by 1 or decreases by 1 whenever a signal is transmitted.

S13. Integrate a device addressing code into a header of the first integrated signal to obtain a second integrated signal.

In step S11, the logical operation is an XOR operation; and in step S13, the device addressing code is different from the ID information, but is in one-to-one correspondence with the ID information.

S14. Modulate the second integrated signal.

S15. Send the modulated second integrated signal in a form of a visible light signal.

Figures 8, 9:
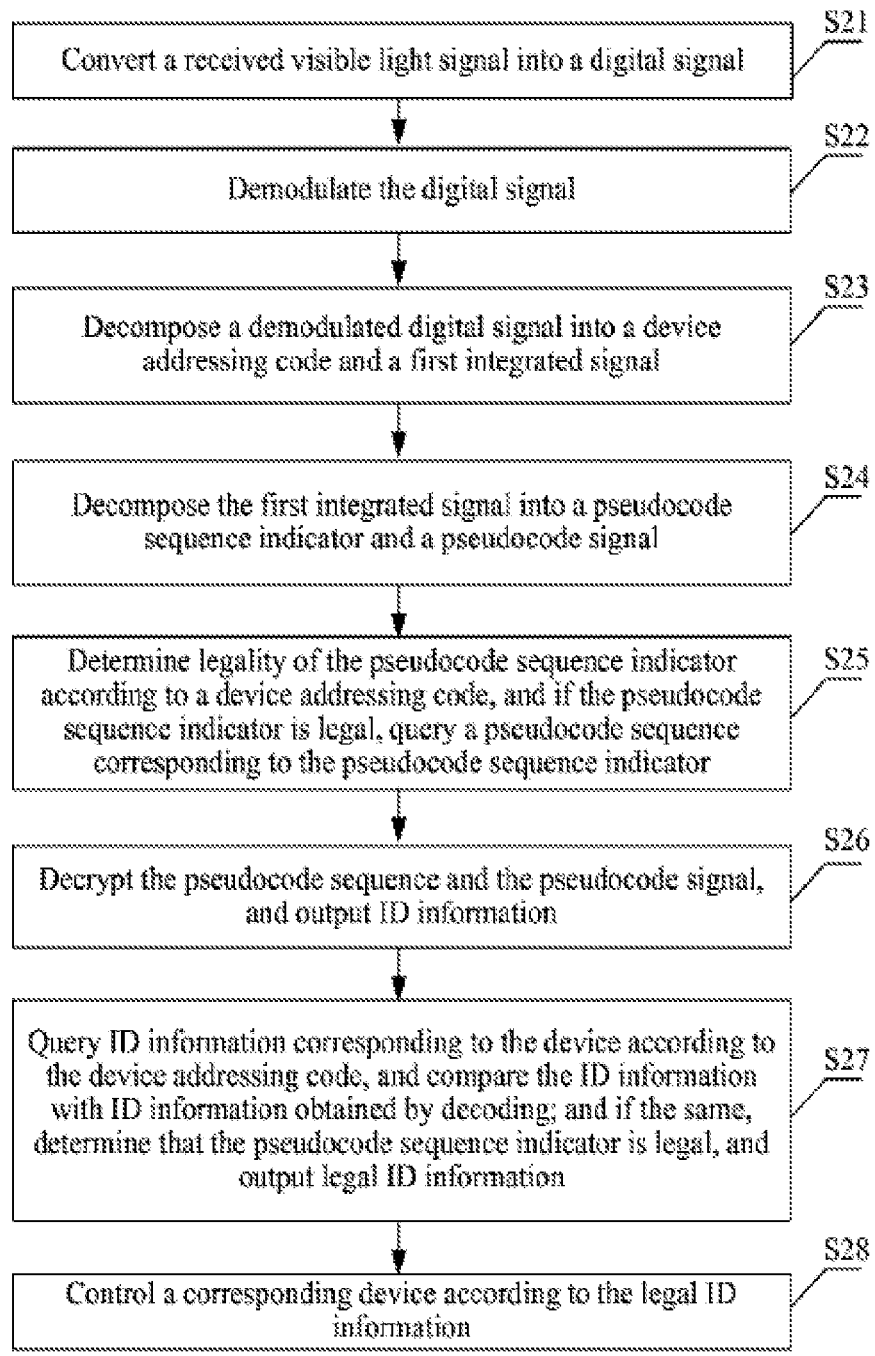
FIG. 8 is a flowchart of a receiving method based on multi-user asynchronous encryption according to an embodiment of the present invention.
FIG. 9 is a schematic diagram of a data structure of second integrated data according to an embodiment of the present invention.

Referring to FIG. 8, FIG. 8 is a flowchart of a receiving method based on multi-user asynchronous encryption according to Embodiment 4 of the present invention. The receiving method includes:

S21. Convert a received visible light signal into a digital signal.

S22. Demodulate the digital signal.

S23. Decompose a demodulated digital signal into a device addressing code and a first integrated signal.

S24. Decompose the first integrated signal into a pseudocode sequence indicator and a pseudocode signal.

S25. Determine legality of the pseudocode sequence indicator according to a device addressing code, and if the pseudocode sequence indicator is legal, query a pseudocode sequence corresponding to the pseudocode sequence indicator.

For example, when the pseudocode sequence indicator is a large number that is not cyclic in ascending order, query the received pseudocode sequence indicator according to the device addressing code; if the pseudocode sequence indicator is less than or equal to the received pseudocode sequence indicator, determine that the pseudocode sequence indicator is invalid; otherwise, determine that the pseudocode sequence indicator is legal; or when the pseudocode sequence indicator is a large number that is not cyclic in descending order, query the received pseudocode sequence indicator according to the device addressing code; if the pseudocode sequence indicator is greater than or equal to the received pseudocode sequence indicator, determine that the pseudocode sequence indicator is invalid; otherwise, determine that the pseudocode sequence indicator is legal.

S27. Decrypt the pseudocode sequence and the pseudocode signal, and output ID information.

S28. Query ID information corresponding to the device according to the device addressing code, and compare the ID information with ID information obtained by decoding; and if the same, determine that the ID is legal, and output legal ID information.

S29. Control a corresponding device according to the legal ID information.

The following describes the foregoing embodiment in more detail using an example in which the embodiment of the present invention is applied in a photonic Internet of things.

Visible light information propagated between a transmitting device and a receiving device of a photonic Internet of things is not original data, but scrambled signals after encryption. The scrambling code herein refers to data generated after a specific logical operation is performed on the original data, for example, a convolution or shift operation is performed for the original data and a pseudocode sequence. The pseudocode sequence is a binary digital sequence generated by a pseudocode generator.

The original data is a digital sequence signal and also called baseband data herein, and in this example, is ID information. The ID information refers to a unique identifier of each transmitting device. According to the decrypted ID information, a device control circuit of a visible light receiving device determines whether a corresponding right is available, and thus determines whether the device can be controlled to make a corresponding response. The pseudocode sequence indicator is a large number that is not cyclic in ascending (or descending) order, and is used to instruct the transmitting device and the receiving device to use which corresponding pseudocode sequence to perform encryption and decryption. The pseudocode sequence indicator increases by 1 automatically (or decreases by 1 automatically) whenever the visible light transmitting device sends a signal. The device addressing code is a unique identifier of each transmitting device, and is different from the ID but is in one-to-one correspondence with the ID. The device addressing code is used to search the receiving device for preset ID information of a corresponding device and a pseudocode sequence indicator previously received by the device.

Referring to FIG. 9, FIG. 9 is schematic structural diagram of second integrated data, it is assumed that the ID information is a 16-bit binary numeral 0000000000000100; the pseudocode sequence indicator is an 8-bit binary numeral 00000010, and a pseudocode sequence corresponding to the pseudocode sequence indicator is a 16-bit binary numeral 1010101100100010; and the device addressing code is also an 8-bit binary numeral 10101010.

First, a logical operation (such as an XOR operation) is performed on the ID information and the pseudocode sequence in the convolutional encoder 102. Operation results are listed in the following table:

TABLE b1

Convolutional encoding process table

| ID information | 10 | 00 | 00 | 00 | 00 | 00 | 00 | 00 | 00 | 00 | 00 | 00 | 00 | 11 | 00 | 00 |
|---|---|---|---|---|---|---|---|---|---|---|---|---|---|---|---|---|
| Pseudocode sequence | 11 | 00 | 11 | 00 | 11 | 00 | 11 | 00 | 00 | 11 | 00 | 00 | 00 | 00 | 11 | 00 |
| XOR operation output | 11 | 00 | 11 | 00 | 11 | 00 | 11 | 01 | 00 | 10 | 01 | 00 | 00 | 11 | 11 | 00 |

From Table b1, it can be seen that the encrypted ID information is 1010101100100110, which is different from the original ID information and brings a specific encryption effect on the data.

The encrypted ID information is sent to the pseudocode sequence indicator integrating unit 103. Meanwhile, the pseudocode generator 101 also transmits the pseudocode sequence indicator corresponding to the pseudocode sequence to the pseudocode sequence indicator integrating unit 103. In the pseudocode sequence indicator integrating unit 103, a pseudocode sequence indicator 00000010 is added as a header to the encrypted ID information, which is then output to the device addressing code integrating unit 104. An output digital sequence is 000000101010101100100110.

In the device addressing code integrating unit 104, a device addressing code 10101010 is then added as a header to the signal output by the pseudocode sequence indicator integrating unit 103, and then output the signal. An output result is 10101010000000101010101100100110. The signal output by the device addressing code integrating unit 104 is then sent to the modulator 105 to undergo signal modulation, and is then output to an LED and is transmitted in a form of a quickly blinking-off visible light signal.

After the visible light emitted from the LED lamp of the transmitting device is transmitted over the air for a short distance, the visible light is received by a visible light receiver 201 in the receiving device, converted into a digital electrical signal, and then demodulated in the demodulator 202. The demodulated output signal is then sent to the device addressing code decomposing unit 203.

The device addressing code decomposing unit 203 separates a device addressing code header from the received demodulated signal 10101010000001010101100100110 to obtain a device addressing code 10101010, and sends the device addressing code 10101010 to a pseudocode sequence querying unit 204 and a querying unit 207 separately. After the device addressing code header is separated, a remaining part is 000000101010101100100110, and is input into the pseudocode sequence indicator decomposing unit 205.

The pseudocode sequence indicator decomposing unit 205 separates a header from the received data to obtain a pseudocode sequence indicator 00000010, and sends the pseudocode sequence indicator to the pseudocode sequence querying unit 204. After the pseudocode sequence indicator decomposing unit 205 separates the pseudocode sequence indicator, the remaining part is 1010101100100110, which is encrypted ID information. The ID information is sent to a convolutional decoder 206.

Input signals of the pseudocode sequence querying unit 204 are a device addressing code 10101010 and a pseudocode sequence indicator 00000010. In the pseudocode sequence querying unit 204, a register corresponding to the device addressing code 10101010 stores a previously received pseudocode sequence indicator corresponding to the device. The pseudocode sequence querying unit 204 compares the previously stored pseudocode sequence indicator with the currently received pseudocode sequence indicator. When an ascending order rule (the pseudocode sequence indicator increases by 1 automatically whenever the transmitting device sends a signal) is applied, if the currently received pseudocode sequence indicator is greater than the stored pseudocode sequence indicator, the currently received signal is a legal signal; otherwise, it indicates that the currently received signal is an illegal signal, and in this case, alarm information may be sent to an alarm unit (not shown in the figure) to raise an alarm.

In another scenario, when a descending order rule (the pseudocode sequence indicator decreases by 1 automatically whenever the transmitting device sends a signal) is applied, if the currently received pseudocode sequence indicator is less than the stored pseudocode sequence indicator, the currently received signal is a legal signal; otherwise, it indicates that the currently received signal is an illegal signal, and an alarm is also raised. If a legal signal is determined, the pseudocode sequence querying unit 204 saves the currently received pseudocode sequence indicator, that is, updates the previously saved pseudocode sequence indicator. Subsequently, the pseudocode sequence querying unit 204 queries a pseudocode sequence database according to the new pseudocode sequence indicator. Because the pseudocode sequence indicator is in one-to-one correspondence with the applied pseudocode sequence, the pseudocode sequence querying unit 204 can find the corresponding pseudocode sequence for use of encryption, and send the pseudocode sequence to the convolutional decoder 206. Because the receiving device and the transmitting device use the same encryption machine, the pseudocode sequence indicator 00000010 sent by the transmitting device can be found, by querying, in the receiving device, which corresponds to the pseudocode sequence 1010101100100010 used by the transmitting device for encryption.

Input signals of the convolutional decoder 206 are encrypted ID information 1010101100100110 and pseudocode sequence 1010101100100010. An XOR operation is performed on the two pieces of data in the following process:

TABLE b2

Convolutional decoding process table

| Encrypted ID information | 11 | 00 | 11 | 00 | 11 | 00 | 11 | 11 | 00 | 00 | 11 | 00 | 00 | 11 | 11 | 00 |
|---|---|---|---|---|---|---|---|---|---|---|---|---|---|---|---|---|
| Pseudocode sequence | 11 | 00 | 11 | 00 | 11 | 00 | 11 | 11 | 00 | 00 | 11 | 00 | 00 | 00 | 11 | 00 |
| XOR operation output | 00 | 00 | 00 | 00 | 00 | 00 | 00 | 00 | 00 | 00 | 00 | 00 | 00 | 11 | 00 | 00 |

From Table b2, it can be seen that the decrypted output ID information is 0000000000000100.

To further eliminate security threats, an ID determiner 208 and a querying unit 207 are disposed in the receiving device. A relatively large pseudocode sequence indicator may be set for some faked signals. Consequently, the pseudocode sequence querying unit 204 mistakenly considers it as a legal signal, selects a pseudocode sequence corresponding to it for decryption and obtains ID information, which is not an authentic ID but mismatches the device addressing code, thereby leading to security threats.

Because the receiving device and the transmitting device use the same encryption machine, after receiving the device addressing code 10101010, the querying unit 207 of the receiving device queries the database to obtain an authentic ID 0000000000000100, and sends the authentic ID to the ID determiner 208.

After receiving the ID information output by the convolutional decoder 206 and the querying unit 207, the ID determiner 208 compares values of both; if the same, which indicates that the received signal is a legal signal, sends the legal ID information to a device control circuit; and if different, which indicates that the received signal is a faked signal and illegal, raises an alarm. In this embodiment, both pieces of the received ID information are 0000000000000100, which is a legal signal, and therefore, the receiving device performs decryption successfully.

It is assumed that the data enumerated in the present invention is shot and replicated by a high-speed camera in a process of communication between the receive end and the transmit end, the replicated signal is an air interface signal 10101010000001010101101100100110. When receiving a legal signal, the receiving device already stores the pseudocode sequence indicator as 00000010 in the legal signal. When further receiving a replicated signal, the receiving device also obtains 00000010 by separating the pseudocode sequence indicator in the replicated signal. According to an ascending order rule of encryption, a subsequently received pseudocode sequence indicator should be greater than 00000010 (which should be less than 00000010 when a descending order rule is applied), but in a replicated signal, the two are equal. Therefore, it can be determined that the signal is a replicated illegal signal.

Further, it is assumed that after a signal is replicated, a new signal is faked by means of modification, that is, by modifying the pseudocode sequence indicator in the signal to 00000011 and keeping the remaining part unchanged. When the ascending order rule is applied, the pseudocode sequence querying unit 204 determines that the signal is a legal signal, and queries a pseudocode sequence corresponding to the pseudocode sequence indicator 00000011. However, the pseudocode sequence is surely different from the encrypted pseudocode sequence. Assuming that the pseudocode sequence querying unit 204 finds, by querying, that the corresponding pseudocode sequence is 1010101100100011, the ID information is decrypted by using the pseudocode sequence, and a process table is as follows:

TABLE b3

Convolutional decoding process table of a faked signal

| Encrypted ID information | 11 | 00 | 11 | 00 | 11 | 10 | 11 | 11 | 00 | 00 | 11 | 00 | 00 | 11 | 11 | 00 |
|---|---|---|---|---|---|---|---|---|---|---|---|---|---|---|---|---|
| Pseudocode sequence | 11 | 00 | 11 | 00 | 11 | 00 | 11 | 11 | 00 | 00 | 11 | 00 | 00 | 00 | 11 | 11 |
| XOR operation output | 00 | 00 | 00 | 00 | 00 | 00 | 00 | 00 | 00 | 00 | 00 | 00 | 00 | 11 | 00 | 11 |

From Table b3, it can be seen that the decrypted ID information of the faked signal is 0000000000000101.

From the foregoing embodiment, it can be seen that the ID information obtained by the querying unit 207 by querying the device addressing code 10101010 is 0000000000000100. Because the decrypted ID information is different from the ID obtained by the querying unit by querying according to the device addressing code, the ID determiner 208 determines that the received signal is a faked illegal signal.

In conclusion, compared with a synchronous encryption method, the multi-user-based asynchronous encryption method in this embodiment is technically easier to implement and more cost-efficient, and can prevent a high-speed camera from shooting and replicating a light signal and improve security of a photonic Internet of things to some extent.

Embodiment 3

Figure 10:
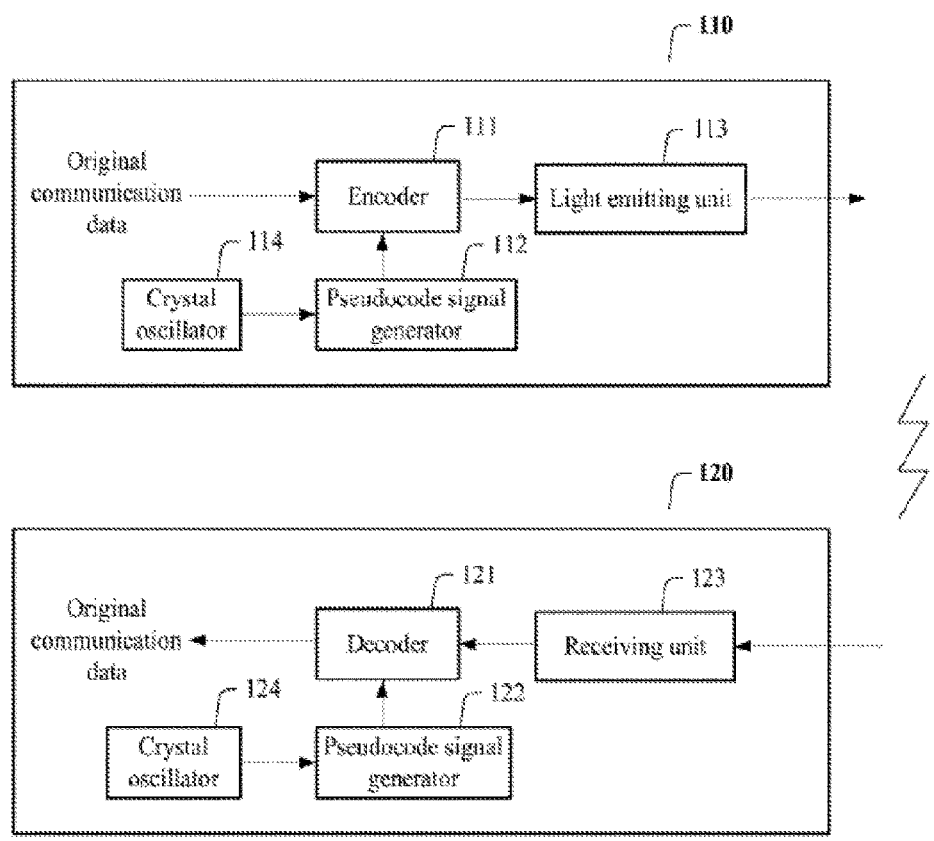
FIG. 10 is a block diagram of a visible light communication system in which the present invention can be implemented.

FIG. 10 shows a visible light communication system 100 in which the present invention can be implemented. The visible light communication system 100 includes a transmit end 110 and a receive end 120. The transmit end 110 includes an encoder 111 and a pseudocode signal generator 112 coupled with the encoder 111. The encoder 111 receives original communication data, and uses a pseudocode signal generated by the pseudocode signal generator 112 to encode the original communication data to generate a scrambled signal. Because the generated scrambled signal is different from the original communication data, an encryption effect is generated. In the specification, the term "encrypt" is interchangeable with the term "encode", and the term "decrypt" is interchangeable with the term "decode". The original communication data may be identity information correlated with the transmit end 110. An encoder 111 outputs a scrambled signal to a light emitting unit 113, which sends the received scrambled signal in a form of visible light. The light emitting unit 113 may be an LED or another component capable of emitting light. The transmit end 110 may be a handheld client in a photonic Internet of things.

The receive end 120 includes a receiving unit 123 configured to receive a visible light signal transmitted by the transmit end 110, and convert the visible light signal into a digital signal. The decoder 121 receives the digital signal output by the receiving unit 123, and uses the pseudocode signal generated by the pseudocode signal generator 122 to decode the digital signal so as to recover the original communication data. Only one transmit end 110 is shown in the visible light communication system 100 in FIG. 10. However, persons skilled in the art can easily understand that multiple transmit ends 110 generally exist corresponding to one receive end 120.

In order to achieve higher security of communication between the transmit end 110 and the receive end 120 and prevent a high-speed camera from shooting and replicating a light signal, a time-varying sequence, such as a pseudocode sequence, a pseudorandom sequence, or a pseudorandom code, is used at both the transmit end 110 and the receive end 120 to encrypt and decrypt the original communication data. Therefore, as shown in FIG. 10, the pseudocode signal generator 112 uses a clock signal provided by a crystal oscillator 114 as a reference and outputs a time-varying pseudocode signal according to a state of a state machine of the transmit end 110. Correspondingly, the pseudocode signal generator 122 at the receive end 120 also uses the clock signal provided by the crystal oscillator 124 as a reference and outputs a time-varying pseudocode signal according to the state of the state machine of the receive end 120.

Figure 11:
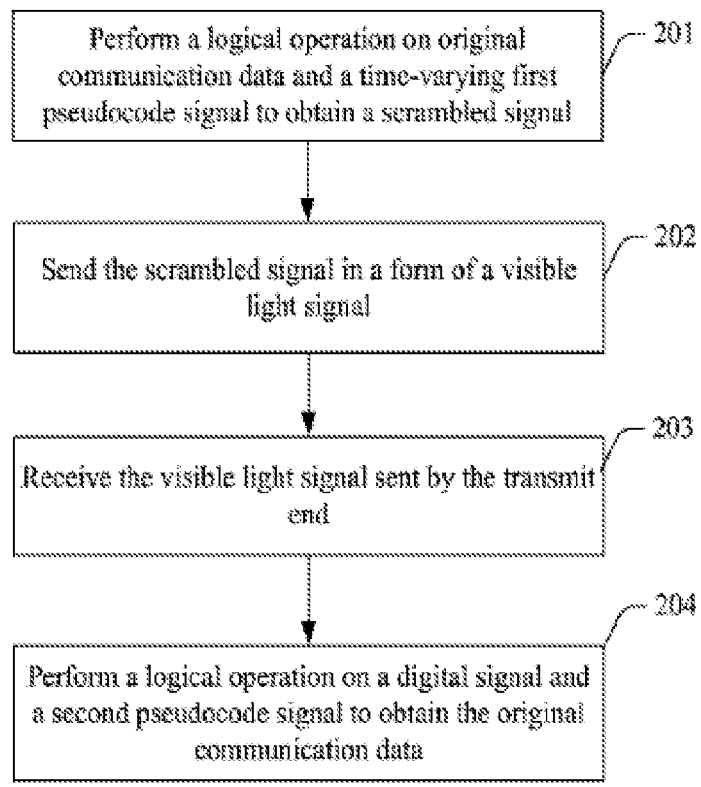
FIG. 11 is a flowchart of an encryption and decryption method used in the visible light communication system in FIG. 10.

FIG. 11 is a flowchart of an encryption and decryption method used in a visible light communication system 100. In step 201, a transmit end 110 performs a logical operation on original communication data and a time-varying first pseudocode signal to obtain a scrambled signal. The original communication data may be user information to be sent, for example, user ID information, a fingerprint, a face, an iris, an input password, other information that assists in verifying the user identity, or a combination of two or more thereof, and may be a digital sequence signal. The pseudocode signal may be a digital sequence that varies with a unit time, where the unit time may be set as required, such as every day, every hour, every minute, or every second. The logical operation on the original communication data and the first pseudocode signal may be logical AND, logical OR, logical XOR, or the like, or may be a combination of two or more thereof.

For example, the original communication data is a user ID of the transmit end, and is always 00001101. When a corresponding transmit end state is N+5 after 5 unit times T elapse, a first pseudocode signal may be 10101010, and therefore, a process of the logical operation on the original communication data and the first pseudocode signal such as "XOR" is shown in the following table:

| | | | | | | | | |
|---|---|---|---|---|---|---|---|---|
| Original communication data | 0 | 0 | 0 | 0 | 1 | 1 | 0 | 1 |
| First pseudocode signal | 1 | 0 | 1 | 0 | 1 | 0 | 1 | 0 |
| Scrambled signal | 1 | 0 | 1 | 0 | 0 | 1 | 1 | 1 |

In step 202, the transmit end 110 sends the scrambled signal in a form of a visible light signal. For example, the transmit end 110 sends a modulated signal in a flashing form by using an LED lamp. For the scrambled signal 10100111, the LED lamp may generate high-frequency flashes. Presence of light represents 1, and absence of light represents 0, or vice versa, thereby implementing visible light communication effectively.

In step 203, a receive end 120 receives the visible light signal sent by the transmit end 110, and converts the visible light signal into a digital signal. For example, for the high-frequency flashes generated by the LED lamp, presence of light represents 1, and absence of light represents 0, or vice versa, thereby the received visible light signal may be converted into a digital signal.

In step 204, the receive end 120 performs decoding, such as a logical operation, on the digital signal and a second pseudocode signal to obtain the original communication data. Specifically, when a corresponding receive end state is N+5 after 5 unit times T elapse, the second pseudocode signal is also 10101010, which has the same code type and the same start phase and end phase as those of the first pseudocode signal. A process of a logical operation, such as an "XOR" process shown in the following table, is performed on the received signal and the second pseudocode signal by the receive end 120.

| | | | | | | | | |
|---|---|---|---|---|---|---|---|---|
| Received signal | 1 | 0 | 1 | 0 | 0 | 1 | 1 | 1 |
| Second pseudocode signal | 1 | 0 | 1 | 0 | 1 | 0 | 1 | 0 |
| Decoded output signal | 0 | 0 | 0 | 0 | 1 | 1 | 0 | 1 |

It can be seen that the decoded output signal is 00001101, which is the same as the original communication data. That is, the original communication data is decoded.

As mentioned above, in order to enable the receive end to decode correctly, the pseudocode signal generated by the pseudocode signal generator at the receive end needs to change synchronously in line with the pseudocode signal generated by the pseudocode signal generator at the transmit end. Specifically, the change of the pseudocode signal is decided by states of state machines at the transmit end and the receive end. Different pseudocode signals correspond to different states of the state machine. Ideally, the states of the state machines of the transmit end and the receive end are synchronous, which enables pseudocode signals of the transmit end and the receive end to also change synchronously. For example, after a specific unit time (for example, 1 second, 1 minute or other specified duration) elapses, the states of the state machines of both the transmit end and the receive end jump from a previous state N to a next state N+1 simultaneously. Correspondingly, the pseudocode signals used for encryption and decryption at the transmit end and the receive end also change from the pseudocode signals corresponding to the state N to the pseudocode signals corresponding to the state N+1.

In the visible light communication system, precision of a clock system of the visible light transmit end 110 and the receive end 120 is decided by their respective crystal oscillators 114 and 124. For reasons such as manufacturing processes and working environments, the crystal oscillators 114 and 124 have errors to some extent, which leads to a difference of time change between the transmit end 110 and the receive end 120. It is assumed that both the transmit end and the receive end start counting time from 0 second, but the clock system of the receive end 120 is relatively quicker. For example, using a standard time as a reference, after 1 second elapses, the clock system at the transmit end 110 may reach only 0.999999 second, but the clock system at the receive end 120 at this time has reached 1.000001 second. An error between the two is 1.000001−0.999999=0.000002 second. After 500000 seconds of the standard time elapse, the difference of displayed clock systems between the transmit end and the receive end is 1 second.

The state change of both the transmit end 110 and the receive end 120 uses their respective clock system as a reference. Due to the error of the clock systems between the transmit end and the receive end, the state changes of the state machines may lose synchronization between the transmit end 110 and the receive end 120. Using an example in which the state machines of the transmit end and the receive end change based on a standard unit time T, assuming that the clock system of the transmit end 110 is slower than the standard time and the clock system of the receive end 110 is quicker than the standard time, after a standard time elapses, a difference between the system time of the transmit end 110 and the system time of the receive end 120 is a unit time T. At this time, the transmit end 110 is in a state N and the receive end 120 is in a state N+1. That is, the pseudocode signal used for decryption at the receive end 120 is different from the pseudocode signal used for encryption at the transmit end 110. Therefore, the receive end 120 cannot perform decryption correctly.

Figure 12:
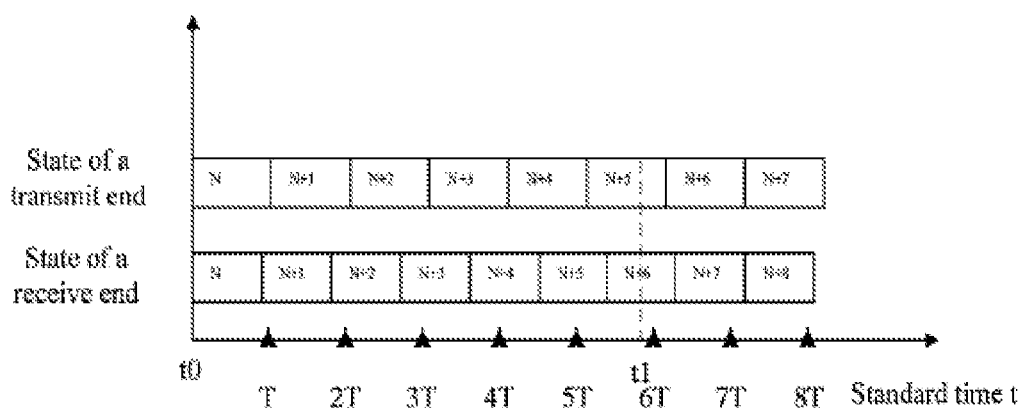
FIG. 12 is a schematic diagram of time-varying states of a transmit end and a receive end in the visible light communication system in FIG. 10.

FIG. 12 is a schematic diagram of time-varying states of state machines of a transmit end and a receive end. As shown in FIG. 12, at a time point t0 of the standard time, it is assumed that the clock system of the transmit end is aligned with the clock system of the receive end, and both the transmit end and the receive end are in the state N, and after a period, they reach a time point t1 of the standard time. At this time, due to a relatively slow clock system, the transmit end is still in a state N+5, but the receive end is already in a state N+6 due to a relatively quick clock system. Therefore, the pseudocode signal selected by the receive end for decryption is inconsistent with the pseudocode signal selected by the transmit end for encryption, which leads to decryption errors.

In view of that, the present invention provides a loose decryption method in a visible light communication system. According to one aspect of the present invention, when a visible light signal is received from the transmit end, a key corresponding to a current state of the state machine of the receive end is used to decrypt the received visible light signal, and in a case that the decryption fails, a key corresponding to at least one state before and/or after the current state is used to decrypt the visible light signal. In this way, erroneous detection caused by clock system errors of the transmit end and the receive end is avoided.

Figure 13:
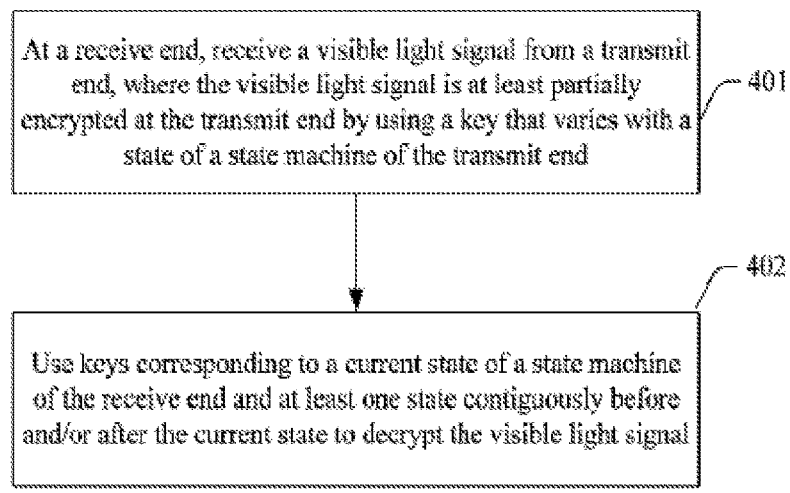
FIG. 13 is a flowchart of a loose decryption method used in a visible light communication system.

FIG. 13 is a flowchart of a loose decryption method in a visible light communication system according to an aspect of the present invention. In step 401, at a receive end, a visible light signal is received from a transmit end, where the visible light signal is at least partially encrypted at the transmit end by using a key that varies with a state of a state machine of the transmit end. In an instance, the visible light signal includes communication data and an identifier of the transmit end, where the communication data is encrypted by using the key that varies with the state of the state machine of the transmit end, and the identifier of the transmit end is not encrypted. For example, the communication data may be user identity (ID) information, and the identifier of the transmit end may be a device number of the transmit end. In a visible light communication system, the device number of the transmit end is unique to the transmit end, and therefore, may be used to uniquely identify the transmit end. The communication data, such as a user ID, is correlated with the identifier of the transmit end and stored at the receive end.

In step 402, keys corresponding to a current state of a state machine of the receive end and at least one state before and/or after the current state are used to decrypt the visible light signal. According to one aspect of the present invention, depending on the relative quickness or slowness of the clock systems of the receive end and the transmit end, the receive end may not only use the current state of the state machine of the receive end, but may also select states of a preset quantity before the current state, select states of a preset quantity after the current state, or select both states of a preset quantity before the current state and states of a preset quantity after the current state. For example, in an instance in which the clock system of the receive end is quicker than the clock system of the transmit end, the receive end may select not only the current state of the state machine of the receive end, but may also select only states of a preset quantity before the current state. In an instance in which the clock system of the receive end is slower than the clock system of the transmit end, the receive end may select not only the current state of the state machine of the receive end, but may also select only states of a preset quantity after the current state. In an instance in which the relative quickness or slowness of the clock systems of the receive end and the transmit end is uncertain, the receive end may select not only the current state of the state machine of the receive end, but may also select both states of a preset quantity before the current state and states of a preset quantity after the current state. The preset quantity may depend on factors such as precision of the crystal oscillator at the receive end and the transmit end and processing capabilities of the receive end and the transmit end.

In an instance, the receive end may use the key corresponding to the current state of the state machine of the receive end to decrypt the visible light signal first. If the decryption succeeds, the process is complete. If the decryption fails, the receive end continues to use the keys corresponding to states of a preset quantity before and/or after the current state to perform the decryption. For example, the receive end may decrypt the visible light signal by consecutively using a key corresponding to each state among states of the preset quantity before and/or after the current state until the visible light signal is decrypted successfully or until the keys corresponding to all states of the preset quantity of states before and/or after the current state have been used for decrypting the visible light signal.

In an instance in which the visible light signal includes encrypted communication data and a non-encrypted identifier of the transmit end, the receive end may obtain the identifier of the transmit end from the visible light signal first, and then retrieve the locally stored communication data correlated with the identifier. After the receive end recovers the communication data by using keys corresponding to a specific state among the selected states, the receive end compare the recovered communication data with the communication data that is stored locally at the receive end. If the two are the same, the decryption is deemed successful. For example, if the recovered user ID is consistent with the user ID stored locally at the receive end, it is considered that the visible light signal is a legal signal. Otherwise, the keys corresponding to the remaining states are further used to decrypt the visible light signal until the decryption succeeds or until the keys corresponding to all selected states have been used to decrypt the visible light signal. If the decryption of the visible light signal fails by using the keys corresponding to the current state and all states among states of a preset quantity before and/or after the current state, it is considered that the visible light signal is an illegal signal.

In the foregoing loose decryption process, the decryption order is to use the key corresponding to the current state first, and then use the keys corresponding to states of a preset quantity before and/or after the current state. However, the order is merely exemplary. In fact, the receive end may perform decryption by using keys corresponding to the current state and each state among at least one state before and/or after the current state in any preset order until the visible light signal is decrypted successfully or until the keys corresponding to all such states have been used for decrypting the visible light signal.

Although the foregoing loose decryption method is illustrated and described as a series of actions for ease of description, it should be understood and comprehended that the method is not limited by the order of actions. According to one or more embodiments of the present invention, some actions may occur in different order, and/or may occur in parallel with other actions that are derived from the schematic diagrams and descriptions herein or that are not illustrated or described herein but are understandable to persons skilled in the art. For example, the foregoing process in which more than the current state is selected for decryption may be that: one state is retrieved at a time, and when the decryption fails by using the key corresponding to the state, a next state is retrieved and the decryption is performed correspondingly until the decryption succeeds or until all states of the preset quantity have been retrieved; or the current state and states of a preset quantity before and/or after the current state are retrieved at a time, and then the decryption is performed consecutively by using the key corresponding to each state until the decryption succeeds.

The following describes the loose decryption method with reference to a state diagram in FIG. 12. At the standard time t1, the receive end receives the visible light signal transmitted by the transmit end. The receive end may convert the received visible light signal into a digital signal, and obtain the non-encrypted device number of the transmit end first. At this time, the current state of the state machine of the receive end is N+6. The receive end may select not only the current state N+6, but also states N+4 and N+5 of a preset quantity (for example, 2) before the current state, and two states N+7 and N+8 after the current state. The receive end may decrypt the digital signal by using a pseudocode sequence corresponding to the current state N+6 first, for example, perform a logical XOR operation to obtain a user ID. The receive end compares the user ID obtained by decryption with the locally stored user ID correlated with the transmit end. The two are different, and the decryption fails. Subsequently, the receive end performs a logical XOR operation in preset order on the digital signal by using pseudocode sequences corresponding to four states before and after the current state. The preset order may be near-to-far order of distance from the current state, such as N+7, N+5, N+8, and N+4. The receive end performs decryption by using a pseudocode sequence corresponding to the state N+7. Because the decrypted user ID is inconsistent with the locally stored user ID, the receive end continues to use the pseudocode sequence corresponding to the state N+5 to perform decryption. At this time, the user ID obtained by decryption is consistent with the locally stored user ID, and therefore, the decryption succeeds, the visible light signal is identified as a legal signal, and the process is terminated. As mentioned above, the preset order may be any order that meets an actual requirement. For example, the receive end may use the corresponding pseudocode sequence for decryption in order of N+4, N+5, N+6, N+7, and N+8 until the decryption succeeds.

Figure 14:
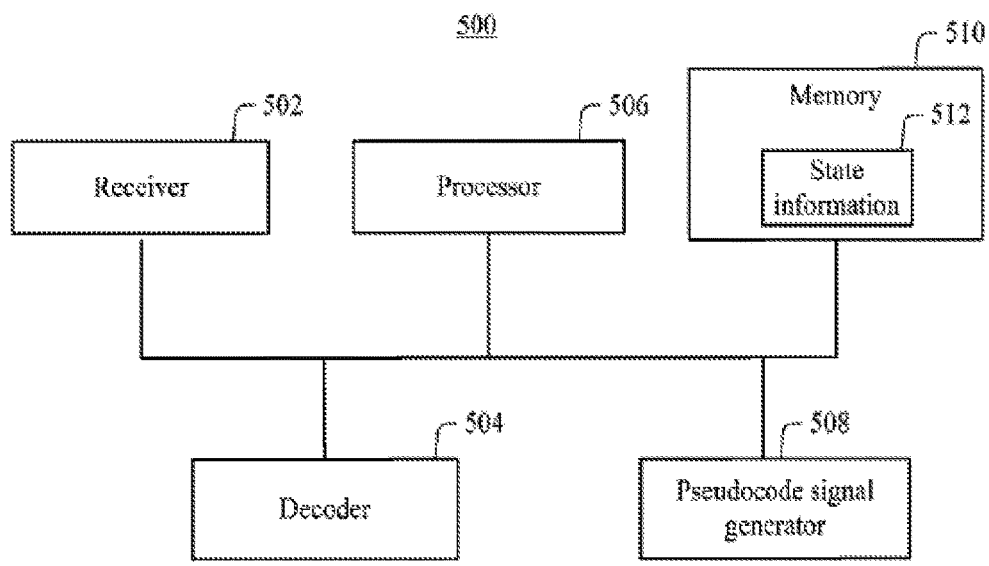
FIG. 14 is a block diagram of a communication device.

FIG. 14 is a block diagram of a communication device 500 according to an aspect of the present invention. The communication device 500 includes a receiver 502 that receives a visible light signal from a transmitting device, where the visible light signal is at least partially encrypted on the transmitting device by using a key that varies with a state of a state machine of the transmitting device. The communication device 500 further includes a decoder 504. The decoder 504 uses keys corresponding to the current state of the state machine of the communication device 500 and at least one state before and/or after the current state to decrypt the visible light signal. According to one aspect of the present invention, depending on the relative quickness or slowness of the clock systems of the communication device 500 and the transmitting device, the decoder 504 may not only use the current state of the state machine of the communication device 500, but may also select states of a preset quantity before the current state, select states of a preset quantity after the current state, or select both states of a preset quantity before the current state and states of a preset quantity after the current state. In an instance, the decoder 504 may use a key corresponding to the current state of the state machine of the communication device 500 to decrypt the visible light signal first. If the decryption succeeds, the process is complete. If the decryption fails, the decoder 504 continues to use the keys corresponding to states of a preset quantity before and/or after the current state to perform the decryption. For example, the decoder 504 may decrypt the visible light signal by consecutively using a key corresponding to each state among the states of the preset quantity before and/or after the current state until the visible light signal is decrypted successfully or until the keys corresponding to all states of the preset quantity of states before and/or after the current state have been used for decrypting the visible light signal. The pseudocode signal generator 508 may generate a key that varies with the state of the state machine of the communication device 500, such as a pseudocode sequence signal.

The communication device 500 may further include a memory 510. The memory 510 may store state information 512, such as a state machine of the communication device 500. The communication device 500 may further include a processor 506. The processor 506 may be a processor that is especially used for analyzing information received by the receiver 502, a processor that controls one or more components of the communication device 500, and/or a processor that both analyzes the information received by the receiver 502 and controls one or more components of the communication device 500.

Figure 15:
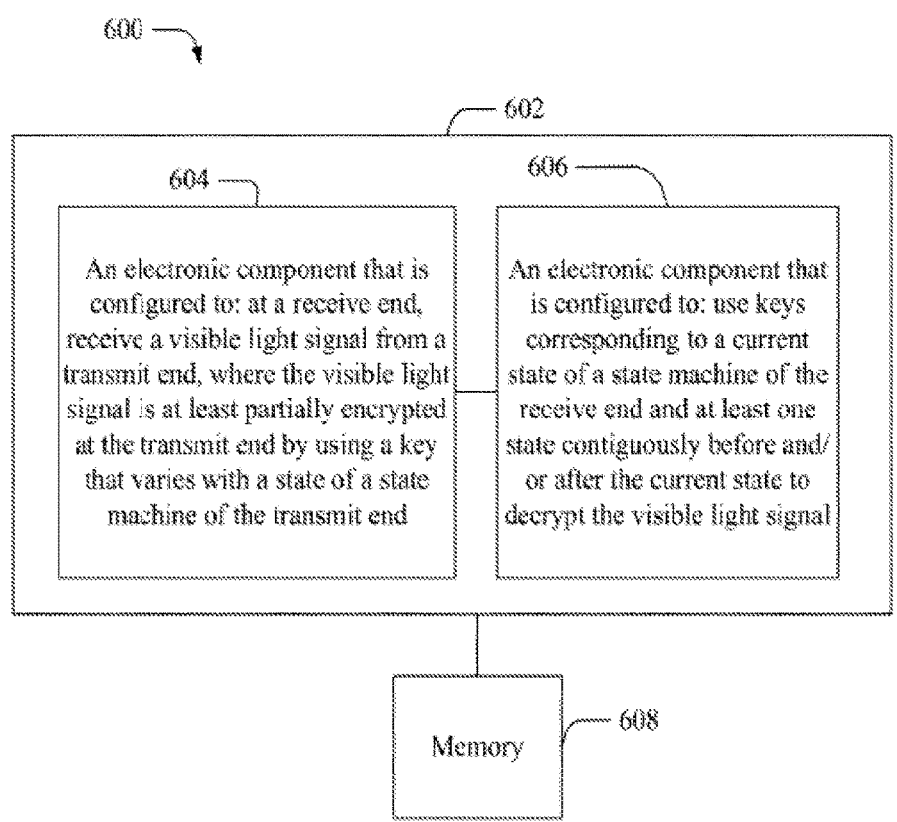
FIG. 15 is a block diagram of a communication device.

FIG. 15 is a block diagram of a communication device 600 according to an aspect of the present invention. It should be comprehended that the communication device 600 is illustrated to include function blocks. Such function blocks may be function blocks implemented by a processor, software or a combination thereof (such as firmware). The communication device 600 includes a logical group 602 of electronic components that can coordinate. For example, the logical group 602 may include an electronic component 604 configured to receive, at a receive end, a visible light signal from a transmit end, where the visible light signal is at least partially encrypted at the transmit end by using a key that varies with the state of the state machine of the transmit end. In addition, the logical group 602 further includes an electronic component 606 configured to decrypt the visible light signal by using keys corresponding to the current state of the state machine of the receive end and at least one state before and/or after the current state. In addition, the communication device 600 may include a memory 608 that stores instructions used to execute functions correlated with the electronic components 604 and 606. Although the illustrated electronic components are located outside the memory 608, it should be understood that one or more of the electronic components 604 and 606 may exist inside the memory 608.

Embodiment 4

A clock adjustment method in this embodiment is not only applicable to obtaining of a key at a receive end, but also applicable to other aspects. The clock adjustment method in this embodiment may be used as an independent technical solution.

Figure 16:
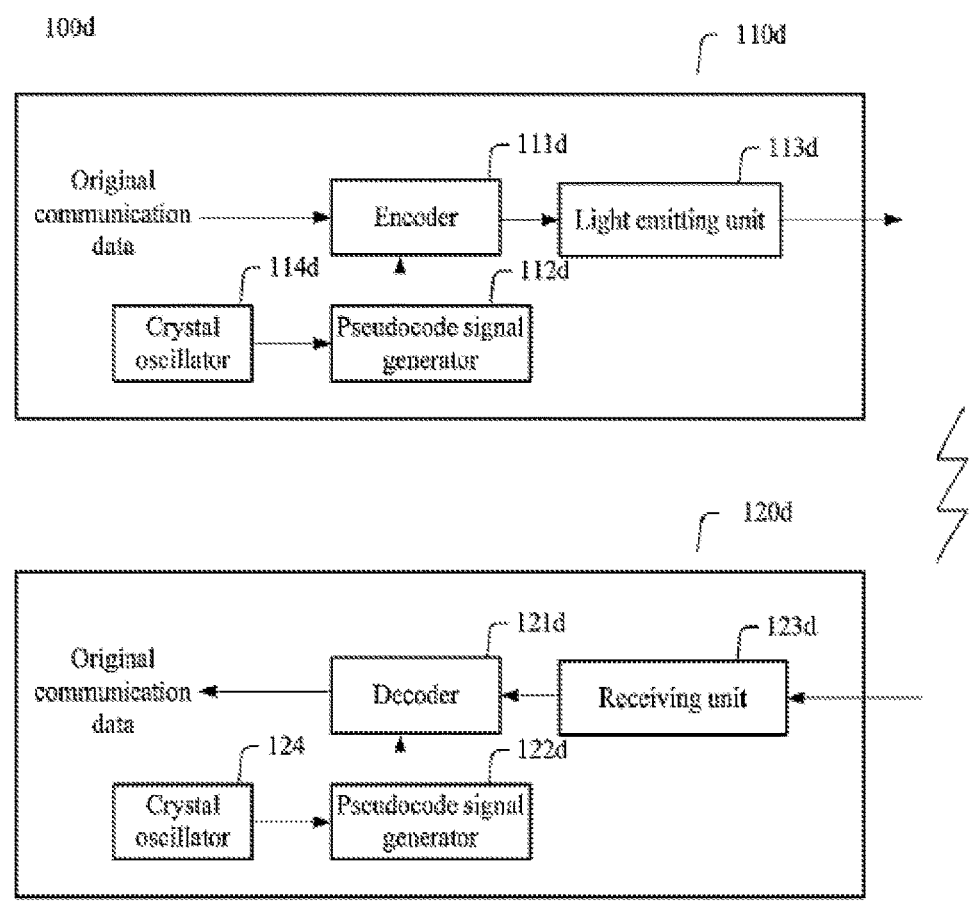
FIG. 16 is a block diagram of a visible light communication system in which the present invention can be implemented.

FIG. 16 shows a visible light communication system 100d in which the present invention can be implemented. The visible light communication system 100d includes a transmit end 110d and a receive end 120d. The transmit end 110d includes an encoder 111d and a pseudocode signal generator 111d coupled with the encoder 112d. The encoder 111d receives original communication data, and uses a pseudocode signal generated by the pseudocode signal generator 112 to encode the original communication data to generate a scrambled signal. Because the generated scrambled signal is different from the original communication data, an encryption effect is generated. In the present invention, the term "encrypt" is interchangeable with the term "encode", and the term "decrypt" is interchangeable with the term "decode". The original communication data may be ID information correlated with the transmit end 110d. An encoder 111 outputs a scrambled signal to a light emitting unit 113d, which sends the received scrambled signal in a form of visible light. The light emitting unit 113d may be an LED or another component capable of emitting light. The transmit end 110d may be a handheld client in a photonic Internet of things.

The receive end 120d includes a receiving unit 123d configured to receive a visible light signal transmitted by the transmit end 110d, and convert the visible light signal into a digital signal. The decoder 121d receives the digital signal output by the receiving unit 123d, and uses the pseudocode signal generated by the pseudocode signal generator 122d to decode the digital signal so as to recover the original communication data. The visible light communication system 100d shown in FIG. 16 shows only one transmit end 110d. However, persons skilled in the art can easily understand that multiple transmit ends 110d generally exist corresponding to one receive end 120d.

In order to achieve higher security of communication between the transmit end 110d and the receive end 120d and prevent a high-speed camera from shooting and replicating a light signal, a time-varying pseudocode sequence is used at both the transmit end 110d and the receive end 120d to encrypt and decrypt the original communication data. Therefore, as shown in FIG. 16, the pseudocode signal generator 112d uses a clock signal provided by a crystal oscillator 114d as a reference and outputs a time-varying pseudocode signal according to a state of a state machine of the transmit end 110d. Correspondingly, the pseudocode signal generator 122d at the receive end 120d also uses the clock signal provided by the crystal oscillator 124d as a reference and outputs a time-varying pseudocode signal according to the state of the state machine of the receive end 120d.

Figure 17:
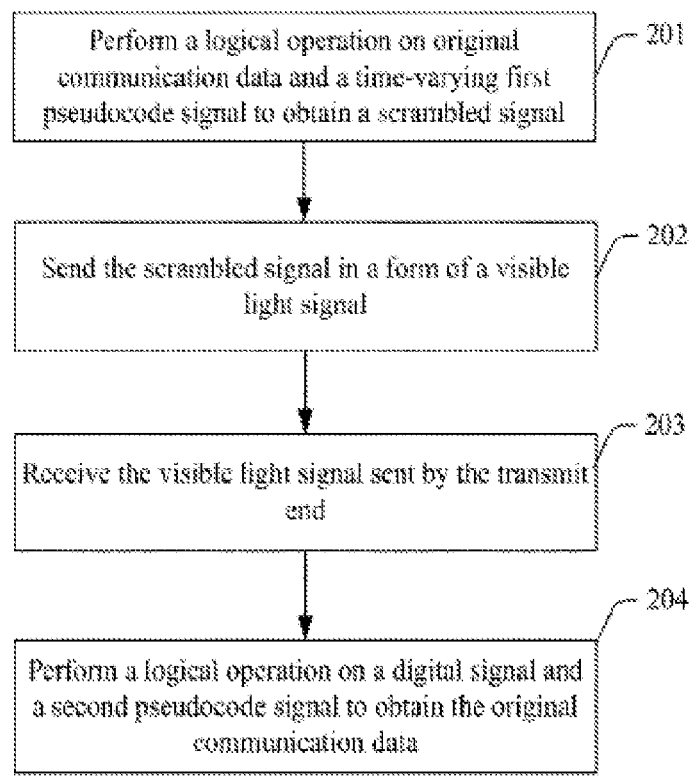
FIG. 17 is a flowchart of an encryption and decryption method used in the visible light communication system in FIG. 16.

FIG. 17 is a flowchart of an encryption and decryption method used in a visible light communication system 100d. In step 201d, a transmit end 110d performs a logical operation on original communication data and a time-varying first pseudocode signal to obtain a scrambled signal. The original communication data may be information to be sent, such as user identity (ID) information, and may be a digital sequence signal. The pseudocode signal may be a digital sequence that varies with a unit time, where the unit time may be set as required, such as every day, every hour, every minute, or every second. The logical operation on the original communication data and the first pseudocode signal may be logical AND, logical OR, logical XOR, or the like, or may be a combination of two or more thereof.

For example, the original communication data is a user ID of the transmit end, and is always 00001101. When a corresponding transmit end state is N+5 after 5 unit times T elapse, a first pseudocode signal may be 10101010, and therefore, a process of the logical operation on the original communication data and the first pseudocode signal such as "XOR" is shown in the following table:

| Original communication data | 0 | 0 | 0 | 0 | 1 | 1 | 0 | 1 |
|---|---|---|---|---|---|---|---|---|
| First pseudocode signal | 1 | 0 | 1 | 0 | 1 | 0 | 1 | 0 |
| Scrambled signal | 1 | 0 | 1 | 0 | 0 | 1 | 1 | 1 |

In step 202, the transmit end 110d sends the scrambled signal in a form of a visible light signal. For example, the transmit end 110d sends a modulated signal in a flashing form by using an LED lamp. For the scrambled signal 10100111, the LED lamp may generate high-frequency flashes. Presence of light represents 1, and absence of light represents 0, or vice versa, thereby implementing visible light communication effectively.

In step 203, a receive end 120d receives a visible light signal transmitted by the transmit end 110d, and converts the visible light signal into a digital signal. For example, for the high-frequency flashes generated by the LED lamp, presence of light represents 1, and absence of light represents 0, or vice versa, thereby the received visible light signal may be converted into a digital signal. A process of converting a light signal into a digital signal is as follows: first, optical-to-electrical conversion is performed, and characteristics of an electrical signal and a light signal of a photodiode are used to generate an electrical pulse signal. However, locations of the transmit end and the receive end are different, that is, strength of each light signal transmitted by a transmit end to a receive end differs. Therefore, strength of an electrical signal of the transmit end also differs, and a current generated by the photodiode needs to be rectified and compared. For example, when a value of a current that passes through a diode is higher than a specific threshold, an optical-to-electrical conversion circuit adjusts an output voltage level value to a high level; and, when a value of a current that passes through the diode is lower than a specific threshold, the optical-to-electrical conversion circuit adjusts the output voltage level value to a low level. The threshold is set in a mathematic model according to different environments. For example, when the distance is long, the threshold may be lower; and, when the distance is short, the threshold may be higher. That is, a change relationship between thresholds is decided by the mathematic model, and may be a linear relationship or a nonlinear relationship. In the foregoing process, the level may be adjusted to a specific range, to ensure a correct pulse shape and ensure correct sampling, and thus ensure correct clock calculation.

In step 204, the receive end 120d performs decoding, such as a logical operation, on the digital signal and a second pseudocode signal to obtain the original communication data. Specifically, when a corresponding receive end state is N+5 after 5 unit times T elapse, the second pseudocode signal is also 10101010, which has the same code type and the same start phase and end phase as those of the first pseudocode signal. A process of a logical operation, such as an "XOR" process shown in the following table, is performed on the received signal and the second pseudocode signal by the receive end 120d.

| Received signal | 1 | 0 | 1 | 0 | 0 | 1 | 1 | 1 |
|---|---|---|---|---|---|---|---|---|
| Second pseudocode signal | 1 | 0 | 1 | 0 | 1 | 0 | 1 | 0 |
| Decoded output signal | 0 | 0 | 0 | 0 | 1 | 1 | 0 | 1 |

It can be seen that the decoded output signal is 00001101, which is the same as the original communication data. That is, the original communication data is decoded.

As mentioned above, in order to enable the receive end to decode correctly, the pseudocode signal generated by the pseudocode signal generator at the receive end needs to change synchronously in line with the pseudocode signal generated by the pseudocode signal generator at the transmit end. Specifically, the change of the pseudocode signal is decided by the states of the state machines of both the transmit end and the receive end. After a specific unit time (for example, 1 second, 1 minute or other specified duration) elapses, the states of the state machines of both the transmit end and the receive end jump from a previous state to a next state. At the same time, the pseudocode signals used for encryption and decryption and corresponding to the states of the state machines also change in the same way.

In the visible light communication system, precision of a clock system of the visible light transmit end 110d and the receive end 120d is decided by their respective crystal oscillators 114d and 124d. For reasons such as manufacturing processes and working environments, the crystal oscillators 114d and 124d have errors to some extent, which leads to a difference of time change between the transmit end 110d and the receive end 120d. It is assumed that both the transmit end and the receive end start counting time from 0 second, but the clock system of the receive end 120 is relatively quicker. For example, using a standard time as a reference, after 1 second elapses, the clock system at the transmit end 110d may reach only 0.999999 second, but the clock system at the receive end 120d at this time has reached 1.000001 second. An error between the two is 1.000001−0.999999=0.000002 second. After 500000 seconds of the standard time elapse, the difference of displayed clock systems between the transmit end and the receive end is 1 second.

In specific implementation of the system, the time change of the clock systems at the transmit end and the receive end are measured by a quantity of minimum unit times of their respective systems—a period of a crystal oscillator. Note that the period of the crystal oscillator herein refers to an actual period of the crystal oscillator (hereinafter referred to as a system period of the crystal oscillator). For example, it is assumed that a nominal frequency of a crystal oscillator 114d of the transmit end 110d is $f_{1\ nominal}$=1 MHz, and a nominal period of the crystal oscillator is $T_{1\ nominal}$=10-6 s. Ideally, if the crystal oscillator 114 is absolutely precise and has no error, that is, the actual frequency of the crystal oscillator 114 (hereinafter referred to as a system frequency of the crystal oscillator) is $f_{1\ system}=f_{1\ nominal}$=1 MHz, then the actual period of the crystal oscillator 114 is $T_{1\ system}=T_{1\ nominal}$=10-6 s. At the transmit end 110d, every $f_{1\ nominal}$ (=106) ($T_{1\ system}$)s are denoted by 1 second of the system time of the clock system of the transmit end. In this ideal scenario, 1 second of the system time of the transmit end is equal to 1 second of the standard time. Similarly, it is assumed that a nominal frequency of a crystal oscillator 124d of the receive end 120d is $f_{2\ nominal}$=1 MHz, and a nominal period of the crystal oscillator is $T_{2\ nominal}$=10-6 s. Ideally, if the crystal oscillator 124d is absolutely precise and has no error, that is, the system frequency of the crystal oscillator 124 is $f_{2\ system}=f_{2\ nominal}$=1 MHz, then the actual period of the crystal oscillator 124d is $T_{2\ system}=T_{2\ nominal}$=10-6 s. At the transmit end 120, every $f_{2\ nominal}$ (=106) ($T_{2\ system}$)s are denoted by 1 second of the system time of the clock system of the receive end. In this ideal scenario, 1 second of the system time of the receive end is equal to 1 second of the standard time.

However, a specific error exists between the actual frequency and the nominal frequency of the crystal oscillator due to factors such as the manufacturing process and working environments, and they are not equal. For example, if system $f_{1\ system} < f_{1\ nominal}$=1 MHz, then $T_{1\ system} > T_{1\ nominal}$=10-6 seconds, but the transmit end 110d still uses $f_{1\ nominal}$ (that is 106) ($T_{1\ system}$)s to denote 1 second of the clock system time. This is very important for understanding the reasons for the quick or slow system time of the transmit end. At this time, in 1 second of the clock system at the transmit end 110d, an $f_{1\ nominal} \cdot T_{1\ system}$ standard time has actually elapsed. The actually elapsed standard time is greater than the 1 second of the standard time. That is, the system time at the transmit end 110d is slower than the standard time. If $f_{2\ system} > T_{2\ nominal}$=1 MHz, then $T_{2\ system} < T_{2\ nominal}$=10-6 seconds, but the receive end 120d still uses $f_{2\ nominal}$ (that is, 106)($T_{2\ system}$)s to denote 1 second of the clock system time. At this time, in 1 second of the clock system at the receive end 120d, an $f_{2\ nominal} \cdot T_{2\ system}$ standard time has actually elapsed. The actually elapsed standard time is less than the 1 second of the standard time. That is, the system time at the receive end 120d is quicker than the standard time. Therefore, it is evident why the system time of the clock systems at the transmit end and the receive end is quicker than or slower than the standard time.

The state change of both the transmit end 110d and the receive end 120d uses their respective clock system as a reference. Due to the error of the clock systems between the transmit end and the receive end, the state changes of the state machines may lose synchronization between the transmit end 110d and the receive end 120d. Using an example in which the state machines of the transmit end and the receive end change based on a standard unit time T, assuming that the clock system of the transmit end 110d is slower than the standard time and the clock system of the receive end 120d is quicker than the standard time, after a standard time elapses, a difference between the system time of the transmit end 110d and the system time of the receive end 120d is a unit time T. At this time, the transmit end 110d is in a state N and the receive end 120d is in a state N+1. That is, the pseudocode signal used for decryption at the receive end 120 is different from the pseudocode signal used for encryption at the transmit end 110d. Therefore, the receive end 120d cannot perform decryption correctly.

Figure 18:
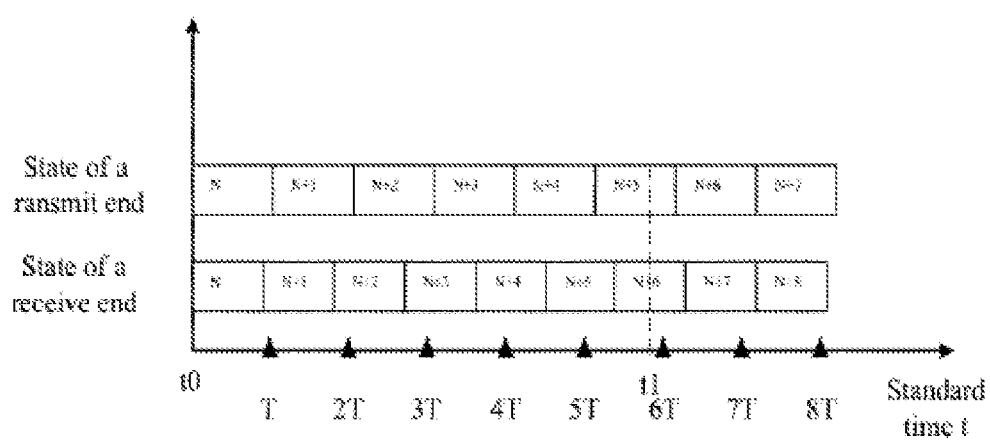
FIG. 18 is a schematic diagram of time-varying states of a transmit end and a receive end in the visible light communication system in FIG. 16.

FIG. 18 is a schematic diagram of time-varying states of state machines of a transmit end and a receive end. As shown in FIG. 18, at a time point t0 of the standard time, it is assumed that the clock system of the transmit end is aligned with the clock system of the receive end, and both the transmit end and the receive end are in the state N. After a period, they reach a time point t1 of the standard time. At this time, due to a relatively slow clock system, the transmit end is still in a state N+5, but the receive end is already in a state N+6 due to a relatively quick clock system. Therefore, the pseudocode signal selected by the receive end for decryption is inconsistent with the pseudocode signal selected by the transmit end for encryption, which leads to decryption errors.

As mentioned above, the system time of the clock system may be quicker or slower than the standard time. In order to measure the extent of quickness or slowness of the system time of the transmit end 110d and the receive end 120d, a concept of "clock change parameter" is introduced in the present invention. The clock change parameter may be an actually elapsed standard time corresponding to a unit time of the system time. It is assumed that 1 second is a unit time. As mentioned above, corresponding to the unit 1 second of the system time of the transmit end 110d, an actually elapsed standard time is $f_{1\ nominal} \cdot T_{1\ system}$. Depending on quickness or slowness of the system clock, the actually elapsed standard time $f_{1\ nominal} \cdot T_{1\ system}$ may be less than or greater than 1 second of the standard time. Corresponding to the unit 1 second of the system time of the receive end 120d, the actually elapsed standard time is $f_{2\ nominal} \cdot T_{2\ system}$. Depending on quickness or slowness of the system clock, the actually elapsed standard time may also be less than or greater than 1 second of the standard time.

The fact that the actually elapsed standard times are different corresponding to the same length of system times at the transmit end and the receive end reflects a quickness or slowness relationship between their system times. A ratio of the actually elapsed standard time corresponding to a unit time of the system time of the receive end 120d to the actually elapsed standard time corresponding to the same unit time of the system time of the transmit end 110d is herein called a clock quickness or slowness factor of the transmit end 110d. Using an example in which the unit time is 1 second, the clock quickness or slowness factor of the transmit end 110d is $Q=(f_{2\ nominal} \cdot T_{2\ system})/(f_{1\ nominal} \cdot T_{1\ system})$. Obviously, the clock quickness or slowness factor is equal to a ratio of a change amplitude of the system time of the transmit end to a change amplitude of the system time of the receive end after the same time has elapsed. Therefore, the change of the system time of the transmit end 110d may be determined at the receive end 120d according to the change of the system time of the receive end 120d.

In order to determine the clock quickness or slowness factor at the receive end 120d, the actually elapsed standard time corresponding to a unit time of the system time at the transmit end and the receive end may be measured by using the number of system periods $T_{2\ system}$ of the local crystal oscillator of the receive end 120d. Assuming that the unit time is nominal duration $T_{0\ nominal}$ of a light pulse of a visible light signal transmitted by the transmit end 110d, $T_{0\ nominal}$ is decided by a nominal baud rate of a signal, and is specifically a reciprocal of the baud rate. For example, in a case that the nominal baud rate is 4800 bps, the nominal duration of a light pulse is $T_{0\ nominal}=1/4800$ second. In the visible light communication system, the baud rate of the visible light used for communication is generally agreed on by the transmit end and the receive end, and therefore, is already known by the receive end 120d. The actually elapsed standard time corresponding to $T_{0\ nominal}$ of the system time of the receive end 120d may be obtained by calculating, and is specifically $(T_{0\ nominal} \cdot f_{2\ nominal}) \cdot T_{2\ system}$, that is $(T_{0\ nominal} \cdot f_{2\ nominal})$ system periods. The actually elapsed standard time corresponding to $T_{0\ nominal}$ of the system time of the transmit end 110d may be obtained at the receive end 120d by measuring duration of a light pulse of the visible light signal from the transmit end 110d, and may be denoted by $M \cdot T_{2\ system}$ using the system period of the crystal oscillator of the receive end 120 as a unit. Correspondingly, the clock quickness or slowness factor of the transmit end 110 is $Q=(T_{0\ nominal} \cdot f_{2\ nominal})/M$. Therefore, the change of the system time of the transmit end 110d may be calculated according to the elapsed system time of the receive end 120d.

Generally, at an early stage after the visible light communication system is established, the error of clock systems between the transmit end and the receive end does not grow over time, and therefore, the clock systems may be considered as aligned. Therefore, at the early stage, for example, when the receive 120d initially communicates with the transmit end 110d during device commissioning, the clock information of the transmit end 110d may be stored at the receive end 120d locally. Specifically, clock information of the transmit end 110d may be set to be consistent with clock information of the receive end 120d at this time. The clock information may refer to a system time value of a clock system. It is assumed that the system time values of the clock systems of the transmit end 110d and the receive end 120d are 00:00. Because the clock systems are aligned between the transmit end and the receive end, the clock information of the transmit end 110d, which is stored locally at the receive end 120d, is consistent with real clock information of the transmit end 110d at this time.

Note that the change of the clock information of the transmit end 110d, which is stored at the receive end 120d, is consistent with the change of the system time of the receive end 120d. Therefore, after the system is established, errors occur between the clock information of the transmit end 110d stored at the receive end 120d and the real clock information at the transmit end 110d over time. Specifically, after a preset time of the system time of the receive end 120d elapses, the change amplitude of the clock information of the transmit end 110d, which is stored locally at the receive end 120d, is also the preset time. However, in fact, the change amplitude of the real clock information of the transmit end 110d should be the preset time multiplied by the time quickness or slowness factor of the transmit end 110d. Therefore, upon elapse of every preset time, the generated error is equal to a result of subtracting a product of the clock quickness or slowness factor of the transmit end 110d and the preset time from the preset time. Correspondingly, the error is subtracted from the stored clock information of the transmit end 110d to update the stored clock information.

Upon elapse of every preset time segment, the receive end 120*d* eliminates the amount of error in the stored clock information of the transmit end 110*d*, so that the updated clock information of the transmit end 110*d* is consistent with the real clock information at the transmit end 110*d*.

As an example for description, it is assumed that the preset time is 5 minutes, and Q=⅘. From 00:00, upon elapse of 5 minutes of the system time at the receive end 120*d*, the clock information of the transmit end 110*d*, which is stored locally at the receive end 120*d*, is 00:05. However, the real clock system change of the transmit end 110 is 5×⅘=4 minutes. That is, the error is 5−4=1 minute. Correspondingly, the error of 1 minute is subtracted from the locally stored clock information 00:05 of the transmit end 110*d* so that the clock information is updated to 00:04. Similarly, upon elapse of another 5 minutes of the system time at the receive end 120*d*, the clock information of the locally stored local information of the transmit end 110*d* is 00:09, which further includes a generated error of 1 minute. Therefore, the updated clock information of the transmit end 110*d* is 00:08.

Because the error of the crystal oscillator between the transmit end and the receive end may change with environment conditions such as temperature, the clock quickness or slowness factor of the transmit end 110*d* may also change. Therefore, whenever a visible light signal of the transmit end 110*d* is received subsequently, the clock quickness or slowness factor may be re-calculated according to the newly received visible light. Correspondingly, according to the locally stored clock information of the transmit end 110*d*, the receive end 120*d* selects a pseudocode signal for decryption. Because the locally stored clock information of the transmit end 110 is adjusted automatically at intervals of the preset time, the error generated against the real clock information at the transmit end 110*d* does not grow. Further, it is ensured that the pseudocode signal, which is selected according to the clock information of the transmit end 110*d* stored at the receive end 120*d*, can be synchronized with the pseudocode signal selected at the transmit end 110*d* according to the real clock information of the transmit end 110*d*.

Figure 19:
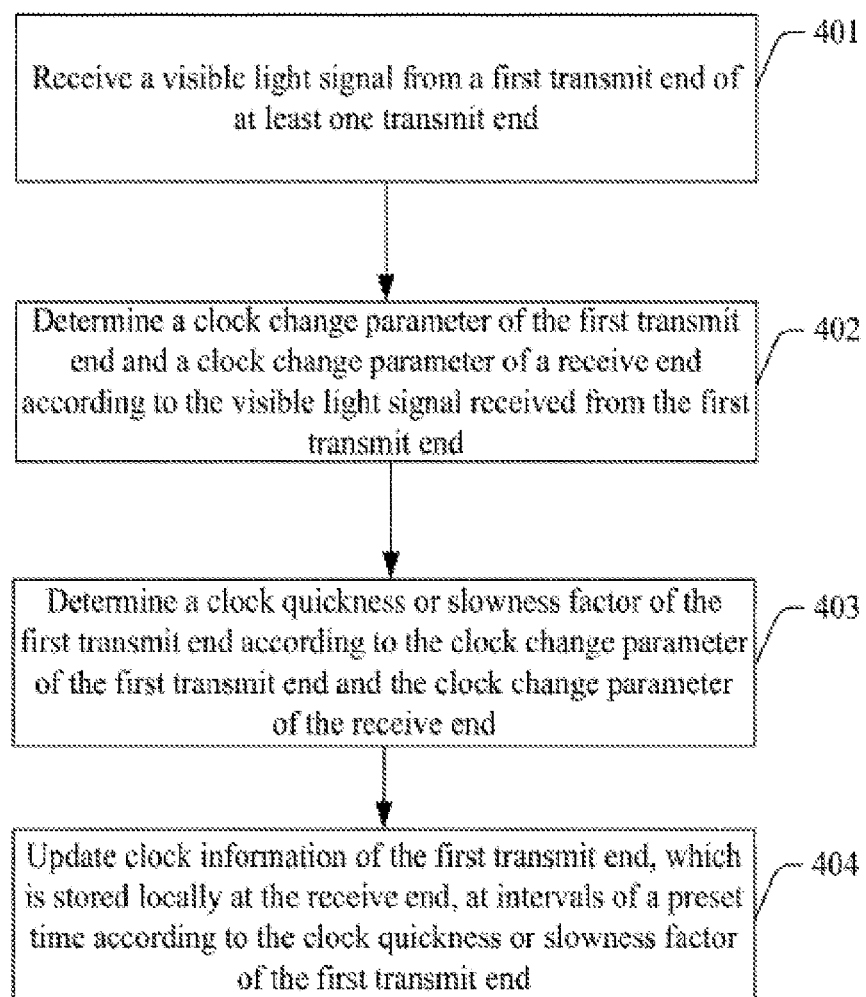
FIG. 19 is a flowchart of a method for adjusting a clock in a visible light communication system automatically according to an aspect of the present invention.

FIG. 19 is a flowchart of a method for adjusting a clock in a visible light communication system automatically according to an aspect of the present invention. Although the method is illustrated and described as a series of actions for ease of description, it should be understood and comprehended that the method is not limited by the order of actions. According to one or more embodiments of the present invention, some actions may occur in different order, and/or may occur in parallel with other actions that are derived from the schematic diagrams and descriptions herein.

In step 401, a receive end receives a visible light signal from a first transmit end of at least one transmit end. The receive end may be a receive end 120*d* in FIG. 16, and the first transmit end may be a transmit end 110*d* in FIG. 16. The visible light signal is a light pulse signal. For example, presence of light represents 1, and absence of light represents 0, or vice versa. The visible light signal generally includes user identity (ID) information of the first transmit end, and the ID information is encrypted by using a pseudocode signal that varies with the system time of the first transmit end. In addition, the visible light signal further includes an identifier for identifying the first transmit end, for example, a device number of the first transmit end. The device number of the transmit end is unique in the system, and therefore, a device number may be used to uniquely identify a transmit end. The identifier is not encrypted, and may be read and obtained by the receive end directly.

In step 402, a clock change parameter of the first transmit end and a clock change parameter of the receive end are determined according to the visible light signal received from the first transmit end. As mentioned above, the clock change parameter of the first transmit end is an actually elapsed standard time corresponding to a unit time of system time of the first transmit end, where the actually elapsed standard time may be measured by using a system period of a crystal oscillator of the receive end as a unit. In an instance, the unit time is nominal duration of a light pulse of a visible light signal from the first transmit end, where the nominal duration is equal to a reciprocal of a nominal baud rate of the visible light signal. The actually elapsed standard time corresponding to the unit time of the system time of the first transmit end may be obtained at the receive end by actually measuring duration of a light pulse of the visible light signal, and may be denoted by $M \cdot T_{2\ system}$ using the system period of the crystal oscillator of the receive end as a unit. In an instance, the receive end may convert the visible light signal into a digital signal, and count how many ($T_{2\ system}$)s have elapsed from the start of a high level or a low level of a pulse of the digital signal until the end of the high level or the low level, where the counted number is M.

The clock change parameter of the receive end may refer to an actually elapsed standard time corresponding to the unit time of system time of the receive end, where the actually elapsed standard time may be measured by using a system period of a crystal oscillator of the receive end as a unit. In an instance in which the unit time is nominal duration $T_{0\ nominal}$ of a light pulse of a visible light signal from the first transmit end, the actually elapsed standard time corresponding to the unit time of the system time of the receive end is calculated as $(T_{0\ nominal} \cdot f_{2\ nominal}) \cdot T_{2\ system}$.

In step 403, the clock quickness or slowness factor of the first transmit end is determined according to the clock change parameter of the first transmit end and the clock change parameter of the receive end. The clock quickness or slowness factor of the first transmit end is a ratio of the actually elapsed standard time corresponding to the unit time of the system time of the receive end to the actually elapsed standard time corresponding to the unit time of the system time of the first transmit end. In an instance in which the unit time is nominal duration $T_{0\ nominal}$ of a light pulse of a visible light signal from the first transmit end, the clock quickness or slowness factor of the first transmit end is $Q=(T_{0\ nominal} \cdot f_{2\ nominal})/M$. Because both $T_{0\ nominal}$ and $f_{2\ nominal}$ are known by the receive end and M is actually measured, the clock quickness or slowness factor of the first transmit end can be obtained at the receive end.

In step 404, clock information of the first transmit end, which is stored locally at the receive end, is updated at intervals of a preset time according to the clock quickness or slowness factor of the first transmit end. As mentioned above, the clock quickness or slowness factor is equal to a ratio of a change amplitude of the system time of the first transmit end to a change amplitude of the system time of the receive end after the same time has elapsed. Therefore, whenever the preset time of the system time elapses at the receive end, a real change amplitude of the system time of the first transmit end should be a product of the clock quickness or slowness factor and the preset time. However, the change amplitude of the system time of the first transmit end, which is stored locally at the receive end, is the preset time. Therefore, an error of the locally stored clock information of the first transmit end is the preset time minus the product. Further, the error can be eliminated by updating the stored clock information by subtracting the error from the locally stored clock information of the first transmit end. In this way, whenever the preset time elapses, the locally stored clock information of the first transmit end is updated.

The clock information of the first transmit end that is stored locally at the receive end may be initially stored when the receive end communicates with the first transmit end at an initial stage after the system is established (for example, when they communicate initially), and may be set to be equal to the then-current clock information of the receive end. That is because the initial communication between the transmit end and the receive end in the visible light communication system generally occurs at the initial stage after the system is established, for example, during commissioning after the system is established. At this time, the clock information of the first transmit end is still not stored at the receive end. At the initial stage after the system is established, it is considered that the clock information is basically consistent between the transmit end and the receive end. Therefore, the current clock information of the receive end may be directly stored at the receive end locally as the clock information of the first transmit end. The clock information may refer to system time of a clock system. For example, when initially receiving the visible light signal of the first transmit end, the receive end may directly read the identifier of the first transmit end such as a device number from the visible light signal, and store the clock information of the first transmit end locally as correlated with the identifier of the first transmit end.

Although not clearly illustrated in FIG. 19, the method may further include: whenever the visible light signal is received from the first transmit end subsequently, re-calculating the clock quickness or slowness factor according to the newly received visible light, and then updating the locally stored clock information of the first transmit end at intervals of the preset time according to the newly calculated clock quickness or slowness factor. In this way, the clock information of the transmit end, which is stored locally at the receive end, can be updated in time, and keep basically consistent with the real clock information of the transmit end. When receiving the visible light of the first transmit end subsequently, the receive end may select a corresponding pseudocode signal according to the locally stored clock information of the first transmit end to decode the received visible light signal. The pseudocode sequence selected in this way is necessarily corresponding to the pseudocode sequence used for encryption at the transmit end, thereby ensuring correct decryption.

Figure 20:
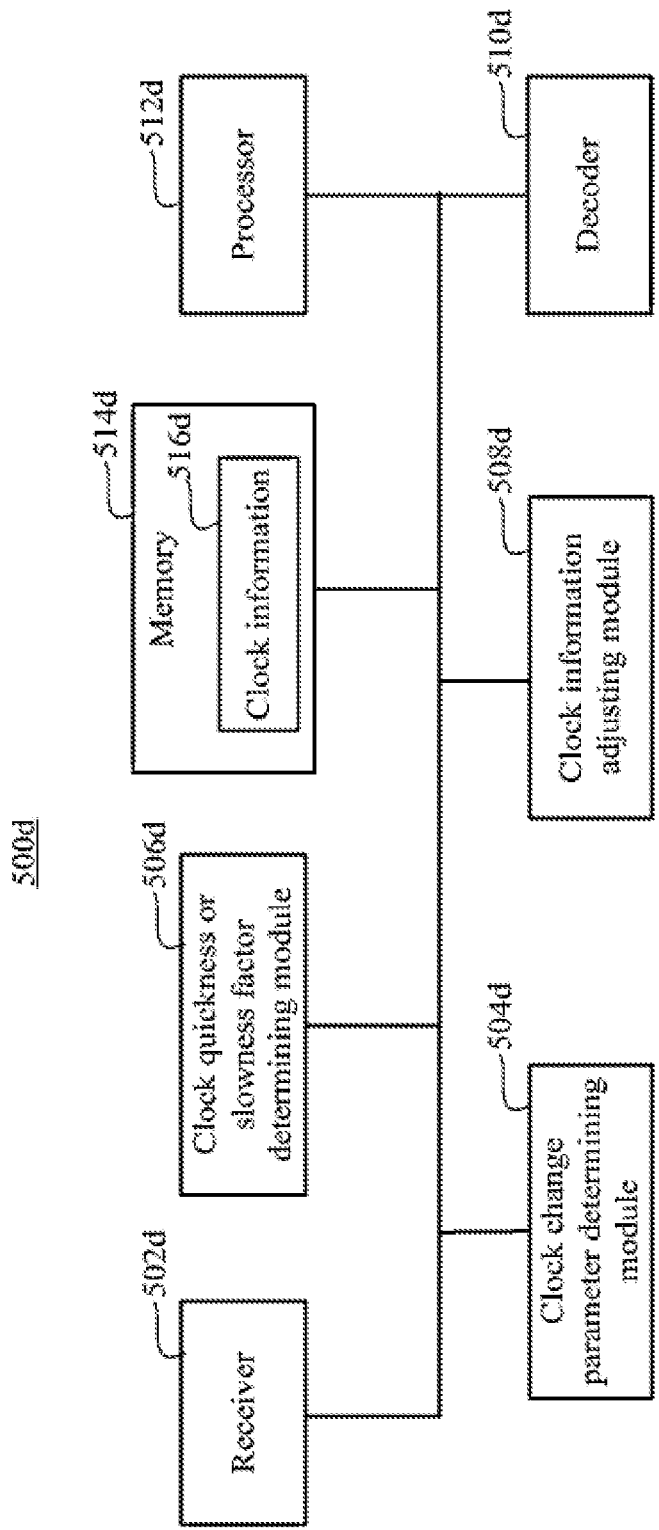
FIG. 20 is a block diagram of a communication device according to an aspect of the present invention.

FIG. 20 is a block diagram of a communication device 500d according to an aspect of the present invention. A receiver 502d may receive a visible light signal from a first transmitting device among at least one transmitting device. A clock change parameter determining unit 504d may determine a clock change parameter of the first transmitting device and a clock change parameter of the communication device 500d according to the visible light signal received from the first transmitting device. As mentioned above, the clock change parameter may be an actually elapsed standard time corresponding to a unit time of the system time. In a case that the unit time is nominal duration of a light pulse of the visible light signal from the first transmitting device, the actually elapsed standard time corresponding to a unit time of system time of the first transmitting device is obtained by the clock change parameter determining module 504d by measuring duration of a light pulse of the visible light signal at the communication device 500d, where the visible light signal is received from the first transmitting device, and the standard time is denoted by $M \cdot T_{2\ system}$ by using the system period of the crystal oscillator of the communication device 500d as a unit; and the actually elapsed standard time corresponding to the unit time of the system time of the communication device 500d is calculated as $(T_{0\ nominal} \cdot f_{2\ nominal}) \cdot T_{2\ system}$ by the clock change parameter determining module 504d, where $T_{0\ nominal}$ is nominal duration of a light pulse of the visible light signal, $f_{2\ nominal}$ is a nominal frequency of the crystal oscillator of the communication device 500d, and $T_{2\ system}$ is the system period of the crystal oscillator of the communication device 500d. A clock quickness or slowness factor module 506d may determine a clock quickness or slowness factor of the first transmitting device according to the clock change parameter of the first transmitting device and the clock change parameter of the communication device 500d. According to one aspect of the present invention, the clock quickness or slowness factor determining module determines that the clock quickness or slowness factor of the first transmitting device is a ratio of the actually elapsed standard time corresponding to the unit time of the system time of the communication device 500d to the actually elapsed standard time corresponding to the unit time of the system time of the first transmitting device. A clock information modulating module 508d updates, at intervals of a preset time and according to the clock quickness or slowness factor of the first transmitting device, the clock information of the first transmitting device that is stored locally in the communication device 500d. According to one aspect of the present invention, the preset time is a preset time of the system time of the communication device 500d; upon elapse of every preset time, an error of the clock information of the first transmitting device that is stored locally in the communication device 500d is a result of subtracting a product of the clock quickness or slowness factor of the first transmitting device and the preset time from the preset time; and therefore, the clock information adjusting module 508d performs update by subtracting the error from the locally stored clock information of the first transmitting device. Whenever the visible light signal is received from the first transmitting device subsequently, a decoder 510d may select a corresponding pseudocode signal according to the stored clock information of the first transmitting device to decode the received visible light signal.

The communication device 500d may further include a memory 514d. The memory 514d may store clock information 516d, such as clock information of the first transmitting device. The communication device 500d further includes a processor 512d. The processor 512d may be a processor that is especially used for analyzing information received by the receiver 502d, a processor that controls one or more components of the communication device 500d, and/or a processor that both analyzes the information received by the receiver 502d and controls one or more components of the communication device 500d.

Figure 21:
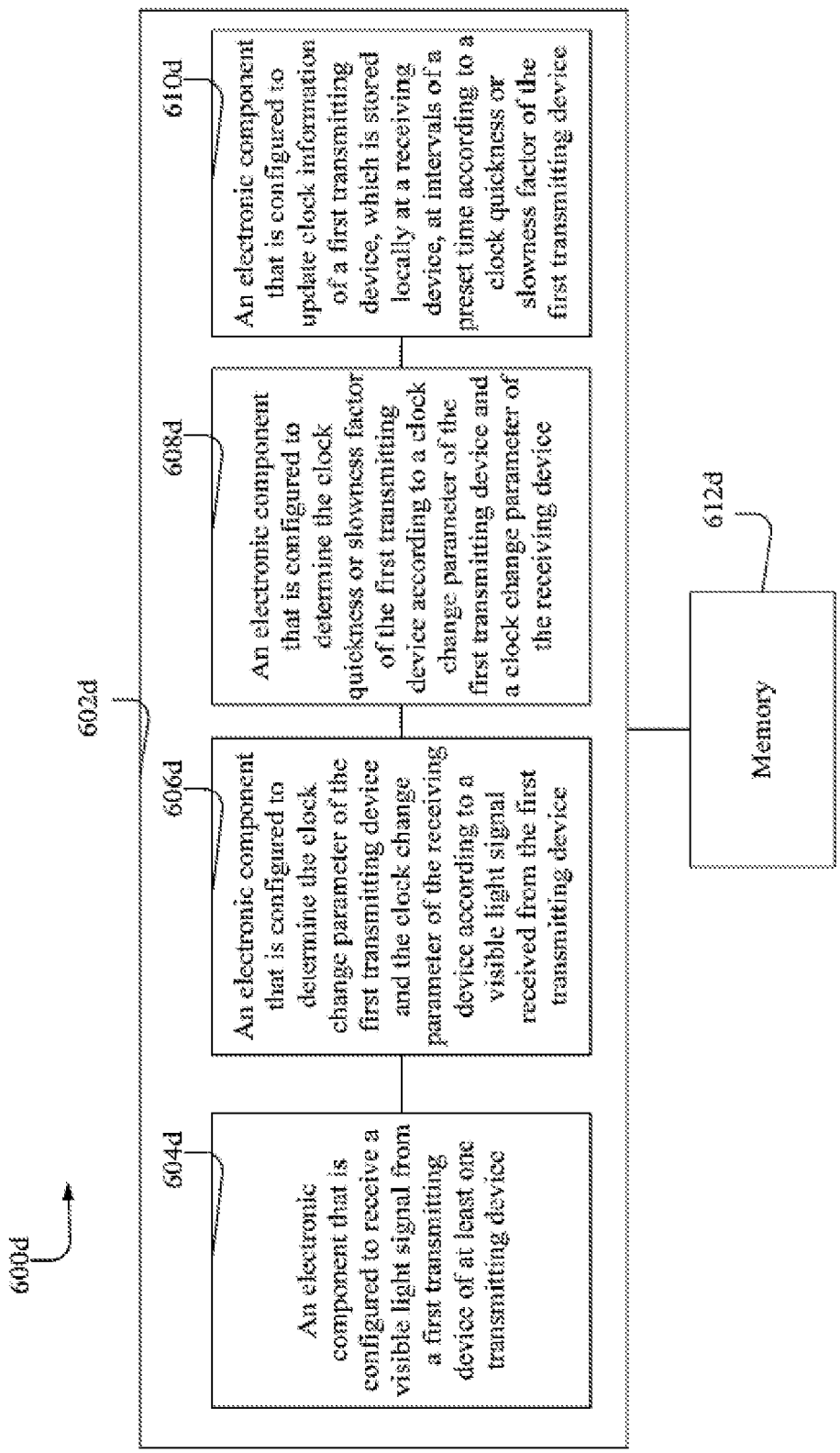
FIG. 21 is a block diagram of a communication device according to an aspect of the present invention.

FIG. 21 is a block diagram of a communication device 600d according to an aspect of the present invention. It should be comprehended that the communication device 600d is illustrated to include function blocks. Such function blocks may be function blocks implemented by a processor, software or a combination thereof (such as firmware). The communication device 600d includes a logical group 602d of electronic components that can coordinate. For example, the logical group 602d may include an electronic component 604d configured to receive a visible light signal from a first transmitting device among at least one transmitting device. The logical group 602d may include an electronic component 606d configured to determine a clock change parameter of the first transmitting device and a clock change parameter of the receiving device according to the visible light signal received from the first transmitting device. The logical group 602d may further include an electronic component 608d configured to determine a clock quickness or slowness factor of the first transmitting device according to the clock change parameter of the first transmitting device and the clock change parameter of the receiving device. In addition, the logical group 602d further includes an electronic component 610d configured to update the clock information of the first transmitting device, which is stored locally in the receiving device, where the update is performed at intervals of a preset time according to the clock quickness or slowness factor of the first transmitting device. In addition, the communication device 600d may include a memory 612d that stores instructions used to execute functions correlated with the electronic components 604d, 606d, 608d, and 610d. Although the illustrated electronic components are located outside the memory 612, it should be understood that one or more of the electronic components 604d, 606d, 608d, and 610d may exist inside the memory 612d.

Persons skilled in the art may understand that information and signals may be represented by using any of various different technologies and techniques. For example, the data, instructions, commands, information, signals, bits (bit), code elements and chips referred to herein may be represented by voltage, current, electromagnetic waves, magnetic fields or magnetic particles, optical fields or optical particles, or any combination thereof.

Persons skilled in the art are further aware that various illustrative logical boards, modules, circuits and algorithm steps described with reference to the embodiments disclosed in the specification may be implemented by electronic hardware or computer software or a combination thereof. In order to clearly describe interchangeability between hardware and software, various illustrative components, frames, modules, circuits, and steps are generically described above in the form of their functionality. Whether the functionality is implemented by hardware or software depends on specific application and design constraints applied to an overall system. Persons skilled in the art may implement the described functionality for each specific application in different manners, but it should not be considered that the implementation goes beyond the scope of the present invention.

Various illustrative logical boards, modules, and circuits described in the embodiments disclosed in the specification may be implemented or executed by a universal processor, a digital signal processor (DSP), an application-specific integrated circuit (ASIC), a field programmable gate array (FPGA), or other programmable logical components, stand-alone gates or transistor logics, stand-alone hardware components, or any combination designed to implement functions described in the specification. The universal processor may be a microprocessor, but in an alternative solution, the processor may be any conventional processor, controller, microcontroller, or state machine. The processor may also be implemented by a combination of computing devices, such as a combination of a DSP and a microprocessor, multiple microprocessors, one or more microprocessors that collaborate with a DSP core, or any other similar configurations.

The steps of methods or algorithms described with reference to the embodiments disclosed in the specification may be reflected directly in hardware, a software module executed by a processor, or a combination thereof. The software module may reside in a RAM memory a flash memory, a ROM memory, an EPROM memory, an EEPROM memory, a register, a hard disk, a movable disk, a CD-ROM, or any other forms of storage medium known in the art. Exemplarily, a storage medium is coupled to a processor, so that the processor can read and write information from/into the storage medium. In an alternative solution, the storage medium may be integrated into the processor. The processor and the storage medium may reside in the ASIC. The ASIC may reside in a user terminal. In an alternative solution, the processor and the storage medium may reside in a user terminal as stand-alone components.

In one or more exemplary embodiments, the described functions may be implemented in hardware, software, firmware, or any combination thereof. If the functions are implemented in software as a computer program product, each function may be stored as one or more instructions or code in a computer-readable medium or transferred by a computer-readable medium. The computer-readable medium includes a computer storage medium and a communication medium, and includes any medium that causes transfer of a computer program from one place to another. The storage medium may be any available medium that can be accessed by a computer. Exemplarily rather than restrictively, the computer-readable medium may include: RAM, ROM, EEPROM, CD-ROM or other optical disc storage, magnetic disk storage or other magnetic storage devices, or any other medium that can be used to carry or store any program code in the form of instructions or data structures and can be accessed by a computer. Any connection is also properly called a computer-readable medium. For example, if software is transferred by using a coaxial cable, an optical cable, a twisted pair, a digital subscriber line (DSL), or transferred from a website, a server or other remote sources by using wireless technologies such as infrared, radio, and microwave, the coaxial cable, optical cable, and twisted pair, DSL, or the wireless technologies such as infrared, radio, and microwave are included in the definition of the medium. The disk (disk) and disc (disc) used in the specification include a compact disc (CD), a laser disc, an optical disc, a digital versatile disc (DVD), a floppy disk and Blue-ray disc, where the disk (disk) generally re-presents data in a magnetic form, and the disc (disc) re-presents data in an optical form by using laser. A combination thereof should also fall within the scope of the computer-readable medium.

The foregoing descriptions are merely exemplary embodiments of the present invention, but are not intended to limit the present invention. Persons skilled in the art understand that the present invention may have various modifications and variations. Any modification, equivalent replacement, and improvement made without departing from the spirit and principle of the present invention shall fall within the protection scope of the present invention.

What is claimed is:

1. A communication device, comprising:
    a receiver, configured to receive a visible light signal from a transmit end and output a digital signal, wherein the visible light signal is encrypted at the transmit end by using a key; or a visible light signal is at least partially encrypted on the transmitting device by using a key that varies with a state of a state machine of the transmitting device;
    a hardware processor, configured to execute program units, the program units comprising:
    a decoder, configured to obtain the key, and decrypt the visible light signal according to the key, wherein the obtaining the key comprises: obtaining the key corresponding to a state of a state machine of a receive end;

or, obtaining indication information according to the visible light signal and obtaining the key according to the indication information;

the decoder is configured to use keys corresponding to a current state of the state machine of the communication device and at least one state before and/or after the current state to decrypt the visible light signal;

the decoder specifically comprises: a pseudocode sequence indicator decomposing unit, configured to decompose the digital signal into a signal that comprises a pseudocode sequence indicator and a pseudocode signal; a pseudocode sequence querying unit, configured to query a pseudocode sequence corresponding to the pseudocode sequence indicator, wherein the pseudocode sequence is the key; and a convolutional decoder, configured to perform a logical operation on the pseudocode sequence and the pseudocode signal and output a logical operation result;

wherein the pseudocode sequence indicator is used to indicate which pseudocode sequence is used by the transmit end and the receive end to perform encryption and decryption;

the decoder further comprises a device addressing code decomposing unit, configured to decompose the digital signal into a device addressing code and a first integrated signal; wherein the device addressing code is a unique identifier of each transmitting device, and is different from the ID but is in one-to-one correspondence with the ID;

the pseudocode sequence indicator decomposing unit is configured to decompose the first integrated signal into the pseudocode sequence indicator and the pseudocode signal; and the pseudocode sequence querying unit is configured to determine legality of the pseudocode sequence indicator according to the device addressing code, and if the pseudocode sequence indicator is legal query the pseudocode sequence corresponding to the pseudocode sequence indicator;

wherein the pseudocode sequence querying unit is configured to determine legality of the pseudocode sequence indicator according to the device addressing code comprises:

when the pseudocode sequence indicator is a large number that is not cyclic in ascending order, query the received pseudocode sequence indicator according to the device addressing code; if the pseudocode sequence indicator is less than or equal to the received pseudocode sequence indicator, determine that the pseudocode sequence indicator is invalid; otherwise, determine that the pseudocode sequence indicator is legal; or when the pseudocode sequence indicator is a large number that is not cyclic in descending order, query the received pseudocode sequence indicator according to the device addressing code; if the pseudocode sequence indicator is greater than or equal to the received pseudocode sequence indicator, determine that the pseudocode sequence indicator is invalid; otherwise, determine that the pseudocode sequence indicator is legal.

2. The device according to claim 1, wherein the receiver receives a visible light signal from a transmitting device, wherein the visible light signal is at least partially encrypted on the transmitting device by using a key that varies with a state of a state machine of the transmitting device;

the decoder is configured to use a key corresponding to the current state of the state machine of the communication device to decrypt the visible light signal; and if the decryption of the visible light signal by using the key corresponding to the current state of the state machine of the communication device fails, continue to decrypts the visible light signal by using a key corresponding to each state of the at least one state before and/or after the current state in preset order until the visible light signal is decrypted successfully or until the keys corresponding to all states of the at least one state before and/or after the current state have been used for decrypting the visible light signal; or the decoder decrypts the visible light signal by using keys corresponding to the current state and each state of the at least one state before and/or after the current state in preset order until the visible light signal is decrypted successfully or until the keys corresponding to the current state and all states of the at least one state before and/or after the current state have been used for decrypting the visible light signal.

3. The device according to claim 1, wherein the receiver is configured to receive the visible light signal from the transmit end; and the decoder comprises: a clock change parameter determining module, which determines a clock change parameter of the transmit end and a clock change parameter of the communication device according to the visible light signal received from the transmit end; a clock quickness or slowness factor determining module, which determines a clock quickness or slowness factor of the transmit end according to the clock change parameter of the transmit end and the clock change parameter of the communication device; and a clock information adjusting module, configured to update clock information of the transmit end at intervals of a preset time according to the clock quickness or slowness factor of the transmit end, wherein the clock information of the transmit end is stored locally in the communication device.

4. The device according to claim 3, wherein the clock change parameter of the transmit end refers to an actually elapsed standard time corresponding to a unit time of system time of the transmit end, and the clock change parameter of the communication device refers to an actually elapsed standard time corresponding to the unit time of system time of the communication device, wherein the actually elapsed standard time is measured by using a system period of a crystal oscillator of the communication device as a unit.

* * * * *